United States Patent
Degirmenci et al.

(10) Patent No.: US 9,626,237 B2
(45) Date of Patent: *Apr. 18, 2017

(54) METHOD OF HOSTING A FIRST APPLICATION IN A SECOND APPLICATION

(71) Applicant: Code Systems Corporation, Seattle, WA (US)

(72) Inventors: Ozcan Degirmenci, Istanbul (TR); Mark Jeremy Zeller, Seattle, WA (US); Stefan I. Larimore, Redmond, WA (US)

(73) Assignee: CODE SYSTEMS CORPORATION, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/960,163

(22) Filed: Dec. 4, 2015

(65) Prior Publication Data
US 2016/0085603 A1    Mar. 24, 2016

Related U.S. Application Data

(63) Continuation of application No. 14/297,506, filed on Jun. 5, 2014, now Pat. No. 9,208,004, which is a
(Continued)

(51) Int. Cl.
*G06F 9/54* (2006.01)

(52) U.S. Cl.
CPC .............. *G06F 9/546* (2013.01); *G06F 9/542* (2013.01); *G06F 2209/545* (2013.01)

(58) Field of Classification Search
CPC ..... G06F 9/546; G06F 9/542; G06F 2209/545
See application file for complete search history.

(56) References Cited

U.S. PATENT DOCUMENTS

| | | |
|---|---|---|
| 4,468,732 A | 8/1984 | Raver |
| 5,437,031 A | 7/1995 | Kitami |

(Continued)

OTHER PUBLICATIONS

Non-Final Office Action, 19 pages, received in U.S. Appl. No. 12/906,904, dated Nov. 13, 2012.
(Continued)

*Primary Examiner* — Syed Roni
(74) *Attorney, Agent, or Firm* — Davis Wright Tremaine LLP; Heather M. Colburn

(57) ABSTRACT

A method of hosting a first application (e.g., a virtual application) inside a second application (e.g., a control displayed by a web browser). The method includes executing the first application inside a runtime environment generated at least in part by a runtime engine. The executing first application calls user interface functions that when executed inside the runtime environment generate a first user interface. The runtime engine captures these calls, generates messages comprising information associated with the captured calls, and forwards the messages to a user interface manager that is a separate application from the runtime engine. The user interface manager receives the messages, translates the information associated with the captured calls into instructions for the second application, and sends the instructions to the second application. The control receives the instructions sent by the user interface manager, and displays a second user interface for the first application based on the instructions.

20 Claims, 13 Drawing Sheets

Related U.S. Application Data continuation of application No. 13/088,265, filed on Apr. 15, 2011, now Pat. No. 8,763,009.

(60) Provisional application No. 61/325,315, filed on Apr. 17, 2010, provisional application No. 61/325,798, filed on Apr. 19, 2010.

(56) References Cited

U.S. PATENT DOCUMENTS

| | | | |
|---|---|---|---|
| 5,495,610 A | 2/1996 | Shing et al. | |
| 5,774,713 A | 6/1998 | Yokota | |
| 5,860,068 A | 1/1999 | Cook | |
| 5,987,590 A | 11/1999 | Wing So | |
| 6,023,712 A | 2/2000 | Spear et al. | |
| 6,192,375 B1 | 2/2001 | Gross | |
| 6,263,363 B1 | 7/2001 | Rosenblatt et al. | |
| 6,345,212 B1 | 2/2002 | Nourse | |
| 6,366,947 B1 | 4/2002 | Kavner | |
| 6,453,334 B1 | 9/2002 | Vinson et al. | |
| 6,493,733 B1 | 12/2002 | Pollack et al. | |
| 6,564,229 B1 | 5/2003 | Baweja et al. | |
| 6,675,216 B1 | 1/2004 | Quatrano et al. | |
| 6,704,808 B2 | 3/2004 | Kasamatsu et al. | |
| 6,757,893 B1 | 6/2004 | Haikin | |
| 7,028,295 B2 | 4/2006 | Li et al. | |
| 7,064,760 B2 | 6/2006 | Capin et al. | |
| 7,065,504 B2 | 6/2006 | Sakuma et al. | |
| 7,076,768 B2 | 7/2006 | Li et al. | |
| 7,089,259 B1 | 8/2006 | Kouznetsov et al. | |
| 7,096,253 B2 | 8/2006 | Vinson et al. | |
| 7,096,416 B1 | 8/2006 | Smith et al. | |
| 7,117,495 B2 | 10/2006 | Blaser et al. | |
| 7,130,073 B2 | 10/2006 | Kumar et al. | |
| 7,162,036 B2 | 1/2007 | Rowe | |
| 7,240,162 B2 | 7/2007 | De Vries | |
| 7,246,351 B2 | 7/2007 | Bloch et al. | |
| 7,272,613 B2 | 9/2007 | Sim et al. | |
| 7,337,298 B2 | 2/2008 | Kawachiya et al. | |
| 7,356,679 B1 | 4/2008 | Le et al. | |
| 7,360,097 B2 | 4/2008 | Rothstein | |
| 7,386,542 B2 | 6/2008 | Maybury et al. | |
| 7,386,546 B1 | 6/2008 | Santry et al. | |
| 7,437,371 B2 | 10/2008 | Rathakrishnan et al. | |
| 7,451,176 B2 | 11/2008 | Anders et al. | |
| 7,451,196 B1 | 11/2008 | de Vries et al. | |
| 7,499,991 B2 | 3/2009 | Johnson | |
| 7,523,116 B2 | 4/2009 | Yan | |
| 7,529,784 B2 | 5/2009 | Kavuri | |
| 7,536,541 B2 | 5/2009 | Isaacson | |
| 7,577,751 B2 | 8/2009 | Vinson et al. | |
| 7,584,342 B1 | 9/2009 | Nordquist et al. | |
| 7,590,644 B2 | 9/2009 | Matsakis et al. | |
| 7,600,097 B1 | 10/2009 | Wright | |
| 7,607,127 B2 | 10/2009 | Romm et al. | |
| 7,623,673 B2 | 11/2009 | Mercier | |
| 7,634,477 B2 | 12/2009 | Hinshaw | |
| 7,634,772 B2 | 12/2009 | Parthasarathy et al. | |
| 7,664,367 B2 | 2/2010 | Suzuki | |
| 7,669,189 B1 | 2/2010 | Umamageswaran | |
| 7,689,825 B2 | 3/2010 | Iwamura | |
| 7,707,564 B2 | 4/2010 | Marvin et al. | |
| 7,743,407 B2 | 6/2010 | Sprigg et al. | |
| 7,752,442 B2 | 7/2010 | Della-Libera et al. | |
| 7,752,511 B2 | 7/2010 | Fulton et al. | |
| 7,761,503 B2 | 7/2010 | Dhawan et al. | |
| 7,797,748 B2 | 9/2010 | Zheng et al. | |
| 7,801,827 B2 | 9/2010 | Bishop et al. | |
| 7,831,047 B2 | 11/2010 | Rowe | |
| 7,836,299 B2 | 11/2010 | England et al. | |
| 7,840,961 B1 | 11/2010 | Weathersby | |
| 7,950,026 B1 | 5/2011 | Urbach | |
| 7,958,497 B1 | 6/2011 | Lindo et al. | |
| 7,970,789 B1 | 6/2011 | Blaser et al. | |
| 7,971,032 B2 | 6/2011 | Shattuck | |
| 8,010,667 B2 | 8/2011 | Zhang et al. | |
| 8,065,675 B2 | 11/2011 | Strauss et al. | |
| 8,069,443 B2 | 11/2011 | Ackerman et al. | |
| 8,073,926 B2 | 12/2011 | Traut et al. | |
| 8,219,805 B1 | 7/2012 | Ie et al. | |
| 8,230,414 B1 | 7/2012 | Hand | |
| 8,230,442 B2 | 7/2012 | Aho et al. | |
| 8,271,944 B2 | 9/2012 | Austin et al. | |
| 8,347,208 B2 | 1/2013 | Howell | |
| 8,356,266 B1 | 1/2013 | Ou et al. | |
| 8,375,140 B2 | 2/2013 | Tippin et al. | |
| 8,387,006 B1 | 2/2013 | Taylor | |
| 8,429,248 B1 | 4/2013 | Ketrenos et al. | |
| 8,434,093 B2 | 4/2013 | Larimore et al. | |
| 8,453,049 B1 | 5/2013 | Grieve | |
| 8,468,175 B2 | 6/2013 | Obata | |
| 8,489,513 B2 | 7/2013 | Bishop et al. | |
| 8,510,734 B2 | 8/2013 | Criddle et al. | |
| 8,626,806 B2 | 1/2014 | Larimore et al. | |
| 8,645,488 B2 | 2/2014 | Ivory et al. | |
| 8,677,345 B2 | 3/2014 | Choi et al. | |
| 8,719,898 B1 | 5/2014 | Barton et al. | |
| 8,745,601 B1 | 6/2014 | Carlson et al. | |
| 8,762,495 B2 | 6/2014 | Obata et al. | |
| 8,763,009 B2 | 6/2014 | Degirmenci et al. | |
| 8,769,051 B2 | 7/2014 | Obata | |
| 8,776,038 B2 | 7/2014 | Larimore et al. | |
| 8,782,106 B2 | 7/2014 | Obata | |
| 8,806,325 B2 | 8/2014 | Decker | |
| 8,914,427 B2 | 12/2014 | Larimore et al. | |
| 8,954,958 B2 | 2/2015 | Murphey et al. | |
| 8,959,183 B2 | 2/2015 | Zeller et al. | |
| 8,978,012 B1 | 3/2015 | Poole | |
| 8,990,289 B2 | 3/2015 | Mott | |
| 9,003,541 B1 | 4/2015 | Patidar | |
| 9,021,015 B2 | 4/2015 | Murphey et al. | |
| 9,098,706 B1 | 8/2015 | Kennedy | |
| 9,104,517 B2 | 8/2015 | Obata et al. | |
| 9,106,425 B2 | 8/2015 | Murphey et al. | |
| 9,158,845 B1 | 10/2015 | Reddy | |
| 9,208,169 B2 | 12/2015 | Obata | |
| 9,229,748 B2 | 1/2016 | Larimore et al. | |
| 9,268,542 B1 | 2/2016 | Mars et al. | |
| 2001/0016905 A1 | 8/2001 | Kasamatsu et al. | |
| 2002/0029283 A1 | 3/2002 | Beckett et al. | |
| 2002/0032754 A1 | 3/2002 | Logston et al. | |
| 2002/0066085 A1 | 5/2002 | Nowlin, Jr. et al. | |
| 2002/0099951 A1 | 7/2002 | O'Connor | |
| 2002/0112078 A1 | 8/2002 | Yach | |
| 2002/0129129 A1 | 9/2002 | Bloch et al. | |
| 2002/0133491 A1 | 9/2002 | Sim et al. | |
| 2002/0138441 A1 | 9/2002 | Lopatic | |
| 2002/0161578 A1 | 10/2002 | Saindon et al. | |
| 2002/0162015 A1 | 10/2002 | Tang | |
| 2002/0174193 A1 | 11/2002 | Mikhalchuk | |
| 2003/0005118 A1 | 1/2003 | Williams | |
| 2003/0031176 A1 | 2/2003 | Sim et al. | |
| 2003/0051169 A1 | 3/2003 | Sprigg et al. | |
| 2004/0003390 A1 | 1/2004 | Canter | |
| 2004/0044645 A1 | 3/2004 | Palumbo | |
| 2004/0083474 A1 | 4/2004 | McKinlay et al. | |
| 2004/0111671 A1 | 6/2004 | Lu | |
| 2004/0128342 A1 | 7/2004 | Maes et al. | |
| 2004/0133444 A1 | 7/2004 | Defaix et al. | |
| 2004/0139315 A1 | 7/2004 | Tokutani et al. | |
| 2004/0237082 A1 | 11/2004 | Alcazar | |
| 2004/0255293 A1 | 12/2004 | Spotswood | |
| 2005/0010932 A1 | 1/2005 | Kohno et al. | |
| 2005/0132359 A1 | 6/2005 | McGuire et al. | |
| 2005/0198628 A1 | 9/2005 | Graham et al. | |
| 2005/0198647 A1 | 9/2005 | Hipp et al. | |
| 2005/0235282 A1 | 10/2005 | Anderson | |
| 2005/0262553 A1 | 11/2005 | Bialick et al. | |
| 2005/0273772 A1 | 12/2005 | Matsakis et al. | |
| 2005/0283673 A1 | 12/2005 | Ode | |
| 2005/0289546 A1 | 12/2005 | Shpeisman et al. | |
| 2006/0048136 A1 | 3/2006 | Vries et al. | |
| 2006/0053380 A1 | 3/2006 | Spataro et al. | |
| 2006/0074733 A1 | 4/2006 | Shukla et al. | |

(56) References Cited

U.S. PATENT DOCUMENTS

| | | |
|---|---|---|
| 2006/0075064 A1 | 4/2006 | Keohane et al. |
| 2006/0085359 A1 | 4/2006 | Kim |
| 2006/0117325 A1 | 6/2006 | Wieland et al. |
| 2006/0123185 A1 | 6/2006 | de Vries et al. |
| 2006/0168294 A1 | 7/2006 | de Vries et al. |
| 2006/0218165 A1 | 9/2006 | Vries et al. |
| 2006/0222203 A1 | 10/2006 | Mercier |
| 2006/0230175 A1 | 10/2006 | de Vries et al. |
| 2006/0242626 A1 | 10/2006 | Pham et al. |
| 2006/0248442 A1 | 11/2006 | Rosenstein et al. |
| 2006/0253535 A1 | 11/2006 | Betros et al. |
| 2006/0256130 A1 | 11/2006 | Gonzalez |
| 2006/0259585 A1 | 11/2006 | Keohane et al. |
| 2007/0011672 A1 | 1/2007 | Bhide et al. |
| 2007/0016721 A1 | 1/2007 | Gay |
| 2007/0043943 A1 | 2/2007 | Peretti |
| 2007/0074191 A1 | 3/2007 | Geisinger |
| 2007/0078988 A1 | 4/2007 | Miloushev et al. |
| 2007/0083482 A1 | 4/2007 | Rathi et al. |
| 2007/0143672 A1 | 6/2007 | Lipton |
| 2007/0143704 A1 | 6/2007 | Laird-McConnell |
| 2007/0168953 A1 | 7/2007 | Diez et al. |
| 2007/0168965 A1 | 7/2007 | Zenz et al. |
| 2007/0174824 A1 | 7/2007 | Relyea et al. |
| 2007/0192329 A1 | 8/2007 | Croft et al. |
| 2007/0226798 A1 | 9/2007 | Sibert |
| 2007/0234277 A1 | 10/2007 | Lei et al. |
| 2007/0240155 A1 | 10/2007 | Shlomai |
| 2007/0245331 A1 | 10/2007 | Daynes et al. |
| 2007/0277102 A1 | 11/2007 | Kanzaki |
| 2007/0283324 A1 | 12/2007 | Geisinger |
| 2007/0294373 A1 | 12/2007 | Harrison |
| 2007/0294674 A1 | 12/2007 | Marilly et al. |
| 2008/0010389 A1 | 1/2008 | Iwata |
| 2008/0016397 A1 | 1/2008 | Pagan |
| 2008/0034268 A1 | 2/2008 | Dodd et al. |
| 2008/0092057 A1 | 4/2008 | Monson et al. |
| 2008/0154985 A1 | 6/2008 | Childs et al. |
| 2008/0155171 A1 | 6/2008 | Jeong |
| 2008/0163194 A1 | 7/2008 | Dias et al. |
| 2008/0181230 A1 | 7/2008 | Hitt et al. |
| 2008/0184135 A1 | 7/2008 | Washburn et al. |
| 2008/0184211 A1 | 7/2008 | Nickolls et al. |
| 2008/0201705 A1 | 8/2008 | Wookey |
| 2008/0215722 A1 | 9/2008 | Hogaboom et al. |
| 2008/0235680 A1 | 9/2008 | Strauss |
| 2008/0275938 A1 | 11/2008 | Yach |
| 2008/0281882 A1 | 11/2008 | Hachio et al. |
| 2008/0294877 A1 | 11/2008 | Haga et al. |
| 2008/0298219 A1 | 12/2008 | Yamagata et al. |
| 2008/0301672 A1 | 12/2008 | Rao et al. |
| 2009/0037287 A1 | 2/2009 | Baitalmal et al. |
| 2009/0055542 A1 | 2/2009 | Zhao et al. |
| 2009/0064086 A1 | 3/2009 | Faus et al. |
| 2009/0076898 A1 | 3/2009 | Wang et al. |
| 2009/0076966 A1 | 3/2009 | Bishop et al. |
| 2009/0077551 A1 | 3/2009 | Whiteley |
| 2009/0077645 A1 | 3/2009 | Kottahachchi |
| 2009/0110307 A1 | 4/2009 | Markowitz |
| 2009/0125907 A1 | 5/2009 | Wen et al. |
| 2009/0132811 A1 | 5/2009 | Koster et al. |
| 2009/0133013 A1 | 5/2009 | Criddle et al. |
| 2009/0158432 A1 | 6/2009 | Zheng et al. |
| 2009/0164570 A1 | 6/2009 | Paila |
| 2009/0172664 A1 | 7/2009 | Mostafa |
| 2009/0193057 A1 | 7/2009 | Maes |
| 2009/0198358 A1 | 8/2009 | Logan et al. |
| 2009/0199175 A1 | 8/2009 | Keller et al. |
| 2009/0216811 A1 | 8/2009 | Manczak et al. |
| 2009/0235158 A1 | 9/2009 | Rosenstein et al. |
| 2009/0240663 A1 | 9/2009 | Plattner et al. |
| 2009/0248695 A1 | 10/2009 | Ozzie |
| 2009/0249071 A1 | 10/2009 | De Atley et al. |
| 2009/0249324 A1 | 10/2009 | Brar et al. |
| 2009/0300076 A1 | 12/2009 | Friedman et al. |
| 2009/0300151 A1 | 12/2009 | Friedman et al. |
| 2009/0307351 A1 | 12/2009 | Raja et al. |
| 2009/0307763 A1 | 12/2009 | Rawlins et al. |
| 2009/0313322 A1 | 12/2009 | Sheehan et al. |
| 2009/0328030 A1 | 12/2009 | Fries |
| 2010/0005291 A1 | 1/2010 | Hulten et al. |
| 2010/0023640 A1 | 1/2010 | Vinson et al. |
| 2010/0023726 A1 | 1/2010 | Aviles |
| 2010/0023934 A1 | 1/2010 | Sheehan et al. |
| 2010/0023974 A1 | 1/2010 | Shiragaki et al. |
| 2010/0037206 A1 | 2/2010 | Larimore et al. |
| 2010/0037216 A1 | 2/2010 | Carcerano et al. |
| 2010/0037235 A1 | 2/2010 | Larimore et al. |
| 2010/0064295 A1 | 3/2010 | Aho et al. |
| 2010/0077096 A1 | 3/2010 | Philip et al. |
| 2010/0082926 A1 | 4/2010 | Sahita et al. |
| 2010/0088448 A1 | 4/2010 | Min et al. |
| 2010/0106804 A1 | 4/2010 | He et al. |
| 2010/0107163 A1 | 4/2010 | Lee |
| 2010/0121973 A1 | 5/2010 | Lobacheva et al. |
| 2010/0131084 A1 | 5/2010 | Van Camp |
| 2010/0132009 A1 | 5/2010 | Khemani et al. |
| 2010/0138479 A1 | 6/2010 | Zhu |
| 2010/0146590 A1 | 6/2010 | Jung |
| 2010/0169790 A1 | 7/2010 | Vaughan et al. |
| 2010/0205604 A1 | 8/2010 | Brower et al. |
| 2010/0235831 A1 | 9/2010 | Dittmer |
| 2010/0241718 A1 | 9/2010 | Rasmussen et al. |
| 2010/0250782 A1 | 9/2010 | Pratt et al. |
| 2010/0281458 A1 | 11/2010 | Paladino et al. |
| 2010/0306849 A1 | 12/2010 | Zheng et al. |
| 2010/0318997 A1 | 12/2010 | Li et al. |
| 2010/0322523 A1 | 12/2010 | Mitsuhashi et al. |
| 2010/0333085 A1 | 12/2010 | Criddle et al. |
| 2011/0004840 A1 | 1/2011 | Feinberg et al. |
| 2011/0022947 A1 | 1/2011 | Rajkumar |
| 2011/0029641 A1 | 2/2011 | Fainberg |
| 2011/0078625 A1 | 3/2011 | Mumford et al. |
| 2011/0106908 A1 | 5/2011 | Risku et al. |
| 2011/0145428 A1 | 6/2011 | Wei et al. |
| 2011/0145592 A1 | 6/2011 | Greiner |
| 2011/0145726 A1 | 6/2011 | Wei et al. |
| 2011/0153437 A1 | 6/2011 | Archer et al. |
| 2011/0153975 A1 | 6/2011 | Accapadi et al. |
| 2011/0154213 A1 | 6/2011 | Wheatley |
| 2011/0173251 A1 | 7/2011 | Sandhu et al. |
| 2011/0173607 A1 | 7/2011 | Murphey et al. |
| 2011/0179411 A1 | 7/2011 | Lederer |
| 2011/0185013 A1 | 7/2011 | Obata et al. |
| 2011/0185043 A1 | 7/2011 | Zeller et al. |
| 2011/0191772 A1 | 8/2011 | Larimore et al. |
| 2011/0225584 A1 | 9/2011 | Andrade et al. |
| 2011/0246659 A1 | 10/2011 | Bouazizi |
| 2011/0265078 A1 | 10/2011 | Beatty et al. |
| 2011/0289513 A1 | 11/2011 | Degirmenci et al. |
| 2011/0302274 A1 | 12/2011 | Lee et al. |
| 2012/0005237 A1 | 1/2012 | Obata |
| 2012/0005244 A1 | 1/2012 | Obata et al. |
| 2012/0005246 A1 | 1/2012 | Obata |
| 2012/0005309 A1 | 1/2012 | Obata et al. |
| 2012/0005310 A1 | 1/2012 | Obata |
| 2012/0005334 A1 | 1/2012 | Raja et al. |
| 2012/0005674 A1 | 1/2012 | Larimore et al. |
| 2012/0054744 A1 | 3/2012 | Singh et al. |
| 2012/0090021 A1 | 4/2012 | Luh et al. |
| 2012/0096071 A1 | 4/2012 | Murphey et al. |
| 2012/0110337 A1 | 5/2012 | Murphey et al. |
| 2012/0125993 A1 | 5/2012 | Thiele et al. |
| 2012/0150986 A1 | 6/2012 | Piccinini et al. |
| 2012/0155358 A1 | 6/2012 | Hao et al. |
| 2012/0203807 A1 | 8/2012 | Larimore et al. |
| 2012/0203808 A1 | 8/2012 | Larimore et al. |
| 2013/0086386 A1 | 4/2013 | Murphey et al. |
| 2013/0104208 A1 | 4/2013 | Kumar et al. |
| 2013/0104219 A1 | 4/2013 | Kumar et al. |
| 2013/0117567 A1 | 5/2013 | Chang et al. |
| 2013/0132525 A1 | 5/2013 | Tippin |
| 2013/0139250 A1 | 5/2013 | Lo et al. |
| 2013/0191882 A1 | 7/2013 | Jolfaei |

(56) References Cited

U.S. PATENT DOCUMENTS

| | | |
|---|---|---|
| 2013/0247070 A1 | 9/2013 | Larimore et al. |
| 2013/0254848 A1 | 9/2013 | Ge |
| 2013/0271456 A1 | 10/2013 | Haswell et al. |
| 2013/0275886 A1 | 10/2013 | Haswell et al. |
| 2013/0283362 A1 | 10/2013 | Kress et al. |
| 2014/0298401 A1 | 10/2014 | Batson et al. |

OTHER PUBLICATIONS

Final Rejection, received in U.S. Appl. No. 12/906,904, dated Jul. 31, 2013.
Notice of Allowance, received in U.S. Appl. No. 12/906,904, dated Oct. 8, 2014.
Non-Final Office Action, 24 pages, received in U.S. Appl. No. 12/916,348, dated Oct. 24, 2012.
Final Office Action, 26 pages, received in U.S. Appl. No. 12/916,348, dated Jul. 11, 2013.
Notice of Allowance, received in U.S. Appl. No. 12/916,348, dated Nov. 13, 2013.
Non-Final Office Action, received in U.S. Appl. No. 12/916,348, dated Sep. 4, 2014.
Notice of Allowance, received in U.S. Appl. No. 12/916,348 , dated Mar. 23, 2015.
Non-Final Office Action, 24 pages, received in U.S. Appl. No. 13/088,265, dated Dec. 12, 2012.
Final Office Action, 33 pages, received in U.S. Appl. No. 13/088,265, dated Jul. 25, 2013.
Notice of Allowance, received in U.S. Appl. No. 13/088,265, dated Feb. 14, 2014.
Non-Final Office Action, 15 pages, received in U.S. Appl. No. 13/171,258, dated Jul. 13, 2012.
Final Office Action, 33 pages, received in U.S. Appl. No. 13/171,258, dated Jan. 11, 2013.
Non-Final Office Action, received in U.S. Appl. No. 13/171,258, dated Apr. 29, 2014.
Final Office Action, received in U.S. Appl. No. 13/171,258, dated Jan. 23, 2015.
Non-Final Office Action, 10 pages, received in U.S. Appl. No. 13/449,049, dated Dec. 13, 2012.
Notice of Allowance, 9 pages, received in U.S. Appl. No. 13/449,049, dated Apr. 29, 2013.
Notice of Allowance, 15 pages, received in U.S. Appl. No. 13/449,049, dated Aug. 13, 2013.
Non-Final Office Action, 9 pages, received in U.S. Appl. No. 13/449,140, dated Dec. 7, 2012.
Final Office Action, 13 pages, received in U.S. Appl. No. 13/449,140, dated Jul. 22, 2013.
Non-Final Rejection, received in U.S. Appl. No. 13/449,140, dated Nov. 15, 2013.
Notice of Allowance, received in U.S. Appl. No. 13/449,140, dated Aug. 11, 2014.
Notice of Allowance, received in U.S. Appl. No. 13/449,140, dated Nov. 20, 2014.
Non-Final Office Action, received in U.S. Appl. No. 13/683,969, dated Feb. 28, 2014.
Non-Final Office Action, received in U.S. Appl. No. 13/683,969, dated Nov. 14, 2014.
Notice of Allowance, received in U.S. Appl. No. 13/683,969, dated Feb. 4, 2015.
Notice of Allowance, received in U.S. Appl. No. 13/683,969 , dated Apr. 2, 2015.
Notice of Allowance, received in U.S. Appl. No. 13/866,682, dated Jun. 25, 2014.
Notice of Allowance, received in U.S. Appl. No. 13/866,682, dated Oct. 28, 2014.
Notice of Allowance, received in U.S. Appl. No. 13/866,682, dated Feb. 17, 2015.
Non-Final Office Action, received in U.S. Appl. No. 13/918,067, dated Feb. 27, 2014.
Notice of Allowance, received in U.S. Appl. No. 13/918,067, dated Nov. 17, 2014.
Notice of Allowance, received in U.S. Appl. No. 13/918,067, dated Mar. 2, 2015.
Non-Final Office Action, received in U.S. Appl. No. 14/262,511, dated Apr. 27, 2015.
Non-Final Office Action, received in U.S. Appl. No. 14/297,468, dated Feb. 26, 2015.
Final Office Action, received in U.S. Appl. No. 14/297,468, dated Oct. 16, 2015.
Non-Final Office Action, received in U.S. Appl. No. 14/297,506, dated Nov. 6, 2014.
Chapin, John, "Hive: Operating System Fault Containment for Shared-Memory Multiprocessors," Technical Report No. CSL-TR-97-712, Computer Systems laboratory, Departments of Electrical Engineering and Computer Science, Stanford University, 156 pages, Jul. 1997.
Hung, Eugene, "Using Behavior Templates to Design Remotely Executing Agents for Wireless Clients," 2004 4th Workshop on Applications and Services in Wireless Networks (ASWN), (2004).
Susitaival, et al., "Analyizing the File Availability and Download Time in a P2P File Sharing System," IEEE, 2007, pp. 88-95.
ThinApp, Introduction to VMware ThinApp, VMware (Published Jun. 27, 2008) retrieved from http://www.vmware.com/pdf/thinapp_intro.pdf on Sep. 27, 2015.
Thinstall, "Application Virtualization: A Technical Overview of the Thinstall Application Virtualization Platform," Nov. 2006.
Zheng et al., "SODON: A High Availability Multi-Source Content Distribution Overlay," IEEE, 2004, pp. 87-92.
Information Disclosure Statement Transmittal filed herewith.
Non-Final Office Action, 20 pages, received in U.S. Appl. No. 12/188,155, dated Dec. 19, 2011.
Final Office Action, 22 pages, received in U.S. Appl. No. 12/188,155, dated Aug. 31, 2012.
Non-Final Office Action, 22 pages, received in U.S. Appl. No. 12/188,155, dated Feb. 28, 2013.
Notice of Allowance, 11 pages, received in U.S. Appl. No. 12/188,155, dated Jun. 25, 2013.
Notice of Allowance, received in U.S. Appl. No. 12/188,155, dated Oct. 25, 2013.
Notice of Allowance, received in U.S. Appl. No. 12/188,155, dated Feb. 13, 2014.
Restriction Requirement, received in U.S. Appl. No. 12/188,161, dated Dec. 20, 2011.
Non-Final Office Action, 14 pages, received in U.S. Appl. No. 12/188,161, dated May 10, 2012.
Notice of Allowance, 13 pages, received in U.S. Appl. No. 12/188,161, dated Oct. 10, 2012.
Notice of Allowance, 12 pages, received in U.S. Appl. No. 12/188,161, dated Dec. 4, 2012.
Notice of Allowance, 13 pages, received in U.S. Appl. No. 12/188,161, dated Jan. 4, 2013.
Non-Final Office Action, 8 pages, received in U.S. Appl. No. 12/685,576, dated Nov. 2, 2012.
Non-Final Office Action, 8 pages, received in U.S. Appl. No. 12/685,576, dated Jun. 20, 2013.
Final Office Action, received in U.S. Appl. No. 12/685,576, dated Jan. 30, 2014.
Notice of Allowance, received in U.S. Appl. No. 12/685,576, dated Sep. 23, 2014.
Non-Final Office Action, 17 pages, received in U.S. Appl. No. 12/695,107, dated Dec. 8, 2011.
Final Office Action, 16 pages, received in U.S. Appl. No. 12/695,107, dated Oct. 30, 2012.
Notice of Allowance, received in U.S. Appl. No. 12/695,107, dated Sep. 17, 2014.
Notice of Allowance, received in U.S. Appl. No. 12/695,107, dated Jan. 5, 2015.
Notice of Allowance, received in U.S. Appl. No. 12/695,107, dated Mar. 19, 2015.
Notice of Allowance, 21 pages, received in U.S. Appl. No. 12/697,029, dated Aug. 17, 2012.

(56) References Cited

OTHER PUBLICATIONS

Notice of Allowance, 26 pages, received in U.S. Appl. No. 12/697,029, dated May 24, 2013.
Notice of Allowance, received in U.S. Appl. No. 12/697,029, dated Oct. 3, 2014.
Notice of Allowance, received in U.S. Appl. No. 12/697,029, dated Jan. 30, 2015.
Restriction Requirement, 5 pages, received in U.S. Appl. No. 12/705,492, dated Mar. 15, 2013.
Restriction Requirement, received in U.S. Appl. No. 12/705,492, dated Aug. 6, 2014.
Notice of Allowance, received in U.S. Appl. No. 12/705,492, dated Sep. 26, 2014.
Non-Final Office Action, 18 pages, received in U.S. Appl. No. 12/876,082, dated Oct. 22, 2012.
Notice of Allowance, 26 pages, received in U.S. Appl. No. 12/876,082, dated May 10, 2013.
Notice of Allowance, received in U.S. Appl. No. 12/876,082, dated Feb. 28, 2014.
Notice of Allowance, received in U.S. Appl. No. 12/876,082, dated Sep. 26, 2014.
Notice of Allowance, received in U.S. Appl. No. 12/876,082, dated Feb. 20, 2015.
Restriction Requirement, received in U.S. Appl. No. 12/876,085, dated Jan. 27, 2012.
Non-Final Office Action, 9 pages, received in U.S. Appl. No. 12/876,085, dated Mar. 8, 2012.
Final Office Action, 12 pages, received in U.S. Appl. No. 12/876,085, dated Nov. 14, 2012.
Non-Final Office Action, 13 pages, received in U.S. Appl. No. 12/876,085, dated Mar. 18, 2013.
Notice of Allowance, received in U.S. Appl. No. 12/876,085, dated Nov. 14, 2013.
Notice of Allowance, received in U.S. Appl. No. 12/876,085, dated Mar. 6, 2014.
Notice of Allowance, 25 pages, received in U.S. Appl. No. 12/877,918, dated Mar. 19, 2012.
Notice of Allowance, 31 pages, received in U.S. Appl. No. 12/877,918, dated Jun. 21, 2012.
Notice of Allowance, 22 pages, received in U.S. Appl. No. 12/877,918, dated Aug. 16, 2012.
Notice of Allowance, 24 pages, received in U.S. Appl. No. 12/877,918, dated Sep. 26, 2012.
Notice of Allowance, 35 pages, received in U.S. Appl. No. 12/877,918, dated Apr. 26, 2013.
Notice of Allowance, received in U.S. Appl. No. 12/877,918, dated Aug. 20, 2013.
Notice of Allowance, received in U.S. Appl. No. 12/877,918, dated Dec. 13, 2013.
Non Final Office Action, 22 pages, received in U.S. Appl. No. 12/879,947, dated Jul. 10, 2013.
Notice of Allowance, received in U.S. Appl. No. 12/879,947, dated Jan. 27, 2014.
Non-Final Office Action, 11 pages, received in U.S. Appl. No. 12/879,956, dated Jun. 6, 2012.
Final Office Action, 11 pages, received in U.S. Appl. No. 12/879,956 , dated Nov. 23, 2012.
Notice of Allowance, 17 pages, received in U.S. Appl. No. 12/879,956, dated Feb. 21, 2013.
U.S. Appl. No. 12/697,029, filed Jan. 29, 2010.
U.S. Appl. No. 12/876,082, filed Sep. 3, 2010.
U.S. Appl. No. 12/916,348, filed Oct. 29, 2010.
U.S. Appl. No. 13/171,258, filed Jun. 28, 2011.
U.S. Appl. No. 13/866,682, filed Apr. 19, 2013.
U.S. Appl. No. 13/918,067, filed Jun. 14, 2013.
U.S. Appl. No. 14/245,707, filed Apr. 4, 2014.
U.S. Appl. No. 14/262,511, filed Apr. 25, 2014.
U.S. Appl. No. 14/297,468, filed Jun. 5, 2014.
U.S. Appl. No. 14/452,382, filed Aug. 5, 2014.
U.S. Appl. No. 14/608,033, filed Jan. 28, 2015.
U.S. Appl. No. 14/608,444, filed Jan. 29, 2015.
U.S. Appl. No. 14/609,895, filed Jan. 30, 2015.
U.S. Appl. No. 14/731,344, filed Jun. 4, 2015.
U.S. Appl. No. 14/789,858, filed Jul. 1, 2015.
U.S. Appl. No. 14/789,813, filed Jul. 1, 2015.
U.S. Appl. No. 14/857,684, filed Sep. 17, 2015.
U.S. Appl. No. 14/877,790, filed Oct. 7, 2015.
U.S. Appl. No. 14/877,793, filed Oct. 7, 2015.
U.S. Appl. No. 15/081,703, filed Mar. 25, 2016.
U.S. Appl. No. 15/247,702, filed Aug. 25, 2016.
Notice of Allowance, dated Oct. 31, 2014, received in U.S Appl. No. 12/705,492.
Notice of Allowance, dated Jun. 5, 2015, received in U.S Appl. No. 13/866,682.
Notice of Allowance, dated Jun. 15, 2015, received in U.S Appl. No. 13/918,067.
Notice of Allowance, dated Jun. 17, 2015, received in U.S Appl. No. 12/876,082.
Non-Final Office Action, dated Jul. 14, 2015, received in U.S Appl. No. 14/608,033.
Non-Final Office Action, dated Feb. 10, 2016, received in U.S Appl. No. 14/452,382.
Non-Final Office Action, dated Feb. 12, 2016, received in U.S Appl. No. 14/245,707.
Non-Final Office Action, dated Feb. 12, 2016, received in U.S Appl. No. 14/789,813.
Non-Final Office Action, dated Apr. 8, 2016, received in U.S Appl. No. 13/171,258.
Notice of Allowance, dated Jun. 7, 2016, received in U.S Appl. No. 14/608,444.
Notice of Allowance, dated Jun. 23, 2016, received in U.S Appl. No. 14/877,793.
Non-Final Office Action, dated Jul. 28, 2016, received in U.S Appl. No. 14/877,890.
Notice of Allowance, dated Sep. 12, 2016, received in U.S Appl. No. 14/452,382.
Final Office Action, dated Sep. 15, 2016, received in U.S Appl. No. 14/789,813.
Non-Final Office Action, dated Sep. 21, 2016, received in U.S Appl. No. 13/171,258.
Lodi, Giorgia, Middleware Services for Dynamic Clustering of Application Servers (University of Bologna, 2006), 99 pages.
Information Disclosure Statement Transmittal submitted herewith.
Non-Final Office Action, dated Dec. 15, 2016, received in U.S Appl. No. 14/789,858.
Notice of Allowance, dated Dec. 21, 2016, received in U.S Appl. No. 14/789,813.
Information Disclosure Statement Transmittal filled herewith.

_US 9,626,237 B2_

METHOD OF HOSTING A FIRST APPLICATION IN A SECOND APPLICATION

CROSS REFERENCE TO RELATED APPLICATION(S)

This application is a continuation of U.S. application Ser. No. 14/297,506 filed on Jun. 5, 2014, now U.S. Pat. No. 9,208,004, which is a continuation of U.S. application Ser. No. 13/088,265, filed Apr. 15, 2011, now U.S. Pat. No. 8,763,009, which claims the benefit of U.S. Provisional Application No. 61/325,315, filed Apr. 17, 2010, and U.S. Provisional Application No. 61/325,798, filed Apr. 19, 2010, which are incorporated herein by reference in their entireties.

BACKGROUND OF THE INVENTION

1. Field of the Invention

The present invention is directed generally to a method of displaying a user interface of a first application within a user interface of a second application.

2. Description of the Related Art

A virtual application is a virtual machine image pre-configured with all of the files, registry data, settings, components, runtimes, and other dependencies required for a specific application to execute immediately and without installation on a host computing device. The virtual application is partially isolated from other applications implemented on a host computing device and partially isolated from an underlying host operating system installed and executing on the host computing device. The virtual application is encapsulated from the host operating system by a virtual runtime environment, which includes a virtual operating system, that receives operations performed by the virtualized application and redirects them to one or more virtualized locations (e.g., a virtual filesystem, virtual registry, and the like).

Thus, the virtual application may be conceptualized as including two components: a virtualization runtime and a virtual application configuration. The virtualization runtime implements the virtual runtime environment, which implements various operating system application programming interfaces ("APIs") in such a way that allows the executing virtual application to access and interact with items that may not be present on the host computer. The virtual application configuration includes data necessary to implement the virtual application within the virtualization runtime.

The virtual application is stored in and implemented by one or more data files and/or executable files. Depending upon the implementation details, the one or more data files and/or executable files storing and implementing the virtual application may include blocks of data corresponding to each application file of a natively installed version of the application. Herein, these blocks of data will be referred to as "virtual application files." The one or more data files and/or executable files storing and implementing the virtual application also include configuration information. When the virtual application is executed, the configuration information is used to configure the virtual operating system to execute the virtual application. For example, the configuration information may contain information related to the virtual application files, virtual registry entries, environment variables, services, and the like. The virtual operating system is configured to communicate with the host operating system as required to execute the virtual application on the host computing device.

Presently, separate applications must be developed for local execution (e.g., within Microsoft Windows) and execution over the Internet (e.g., inside a web browser, such as Internet Explorer). In particular, different interfaces must be created for the separate applications. Therefore, a need exists for a method of hosting a first application (e.g., an application designed to execute within a local operating system such as Microsoft Windows) within a second application (e.g., a web browser) such that an interface developed for one environment (e.g., Microsoft Windows) may be implemented (or hosted) in a second different environment (e.g., a web browser). The present application provides these and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

As is apparent to those of ordinary skill in the art, most natively installed Microsoft Windows applications display a user interface by calling functions exposed in the Microsoft Windows Software Development Kit (hereafter "SDK exposed functions"). Generally, using these functions, each windows application creates its own unique windows in a customized order. Further, these windows may have predetermined behaviors.

To instead display an interface inside another application (e.g., a Web Browser), calls to the SDK exposed functions must be captured, translated into commands the other application will understand, and sent to that application.

The present disclosure describes a system and method for displaying the user interface (windows) of a first application (e.g., a virtual application) in a second application (e.g., a Web Browser).

Figure 1:
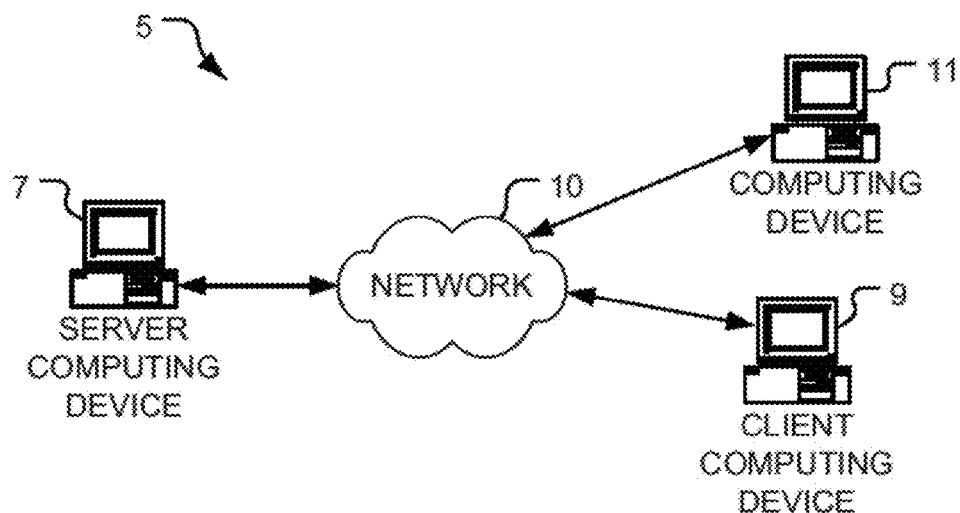
FIG. 1 is a diagram of a system for transferring a virtualized application file from a server computing device to a client computing device over a network.

FIG. 1 illustrates a system 5 for downloading or otherwise transferring a virtualized application file stored on a server computing device 7 to a client computing device 9 over a network 10 (e.g., the Internet, a WAN, a LAN, a combination thereof, and the like). One or more additional computing devices, such as the computing device 11 may also be coupled to the network 10. In the embodiment illustrated, the server computing device 7 is implemented as a web server. A diagram of hardware and an operating environment in conjunction with which implementations of the server computing device 7, the client computing device 9, the network 10, and the computing device 11 may be practiced is provided in FIG. 8 and described below.

Figure 2:
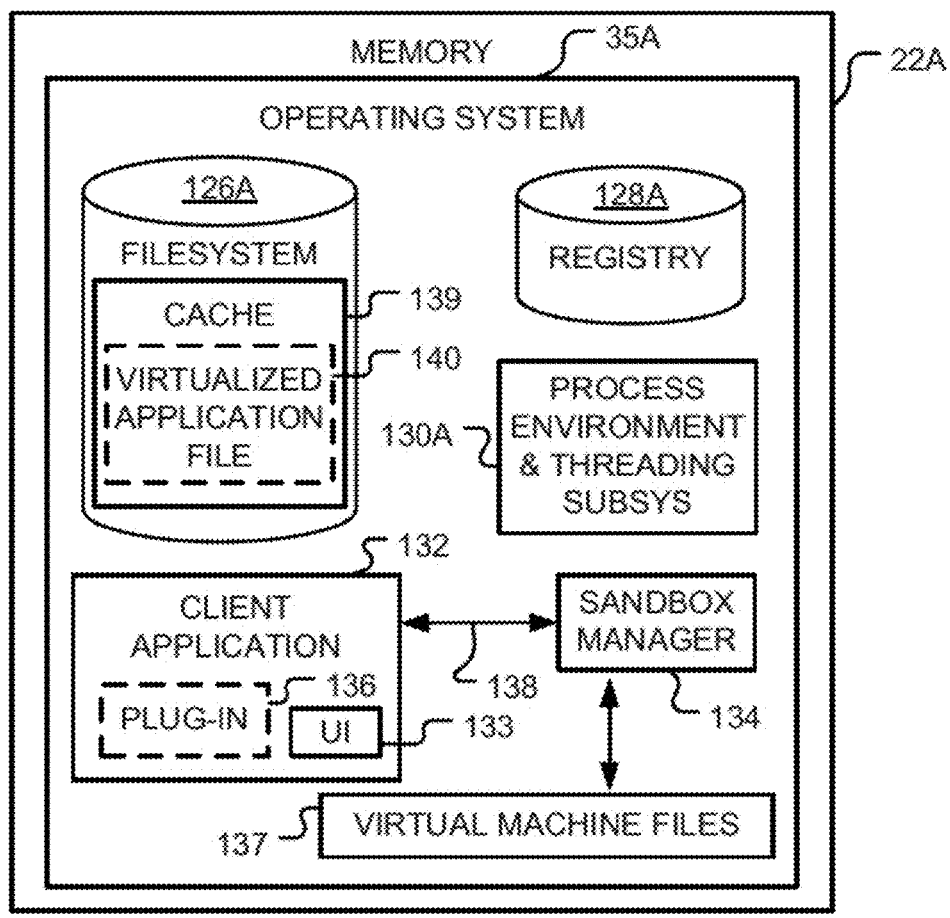
FIG. 2 is an illustration of a conceptualization of software components stored in a system memory of the client computing device of FIG. 1, the software components including a Client Application and a Sandbox Manager.

FIG. 2 illustrates a system memory 22A of the client computing device 9 (illustrated in FIG. 1) storing a conventional operating system 35A, that like most operating systems, includes a filesystem 126A, a registry 128A, and a process environment and threading subsystems component 130A. A Client Application 132 (e.g., a web browser application) and a Sandbox Manager 134 are also stored in the system memory 22A of the client computing device 9 (illustrated in FIG. 1). Optionally, as explained below, the Client Application 132 may include a plug-in 136 or similar application. The plug-in 136 and the Sandbox Manager 134 are described in U.S. patent application Ser. No. 12/695,107, filed on Jan. 27, 2010, which is incorporated herein by reference in its entirely.

In the embodiment illustrated, the Client Application 132 communicates with the Sandbox Manager 134 over a communication link 138 that may be implemented as a Transmission Control Protocol ("TCP") connection using TCP protocol. A cache 139 may be stored on the filesystem 126A for use by the Sandbox Manager 134.

As explained above, a virtualized application file 140 is transferred to the client computing device 9 from the server computing device 7. Likewise, the UI configuration file 169 may be transferred to the client computing device 9 from the server computing device 7. The virtualized application file 140 is illustrated in dashed lines to indicate that the virtualized application file 140 is stored in the cache 139 during and after the download. However, before the download begins, the virtualized application file 140 is not stored in the cache 139. The UI configuration file 169 may be stored in the cache 139 in a manner similar to that described with respect to the virtualized application file 140. As will be explained below, the virtualized application file 140 may be an executable file or a file configured to execute within a virtualized environment provided by a virtual machine.

The system memory 22A stores one or more files implementing one or more virtual machines. By way of a non-limiting example, the system memory 22A may include a plurality of virtual machine executable files 137 that when executed, each implement a different virtual machine. For example, each of the virtual machine executable files 137 may implement a different version of the same virtual machine. The virtual machine executable files 137 may be executed individually. When executed, a virtual machine executable file implements a virtualized environment. Execution of a virtual machine executable file may be initiated by the Sandbox Manager 134 using a command including a parameter (e.g., a file path) identifying a virtualized application file to execute. In response to receiving the parameter, the virtual machine executable file executes the identified virtualized application file inside the virtualized environment implemented by the virtual machine executable file. The virtual machine may execute within an operating system shell process. Optionally, the virtual machine executable files 137 may be stored in the cache 139.

The virtualized application file 140 includes a version identifier that may be used by the Sandbox Manager 134 to select which of the virtual machine executable files 137 is configured to execute the virtualized application file 140.

Figure 3:
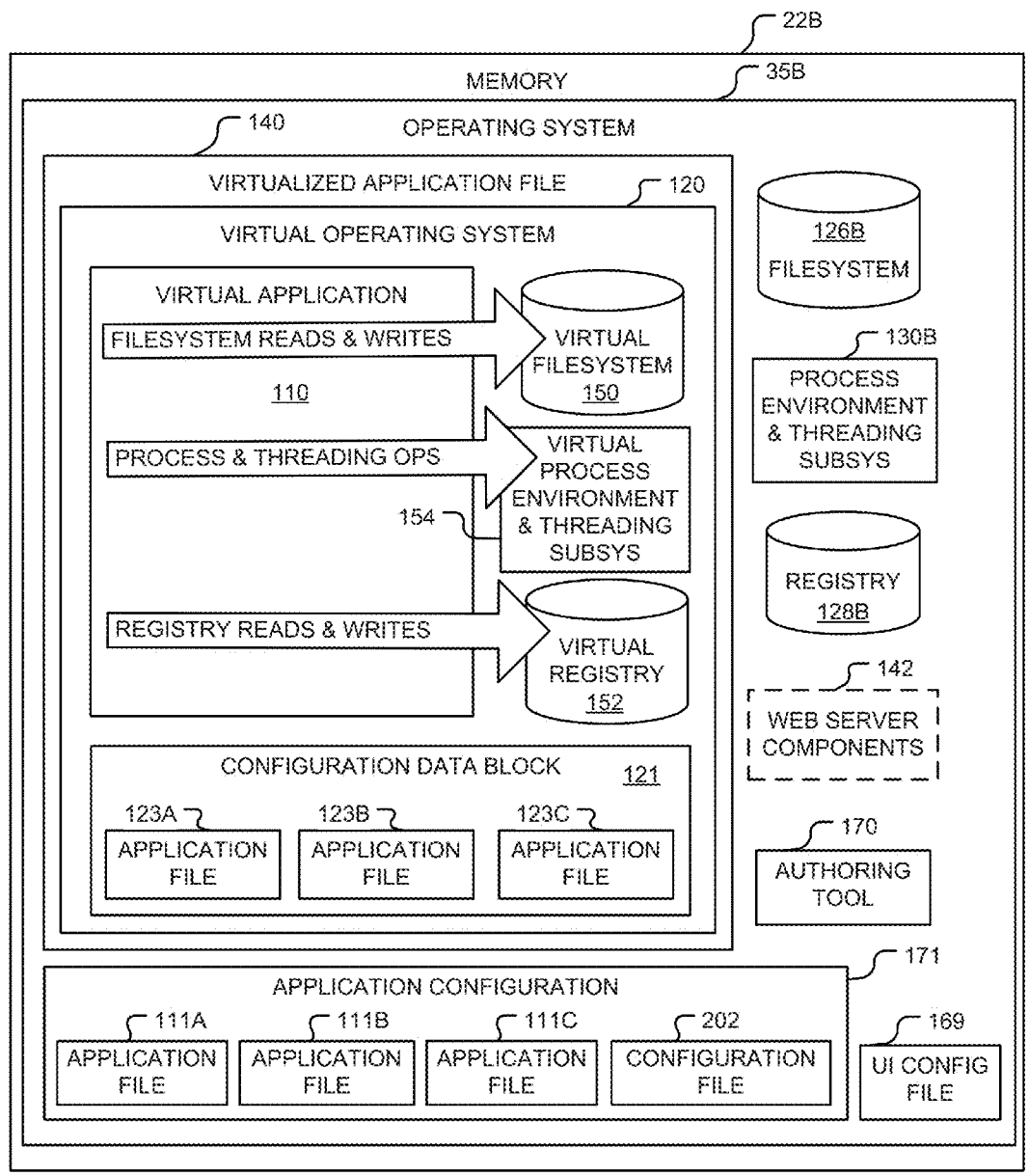
FIG. 3 is an illustration of a conceptualization of software components stored in a system memory of the server computing device of FIG. 1, the software components including a virtualized application file.

FIG. 3 illustrates a system memory 22B of the server computing device 7 (illustrated in FIG. 1). The system memory 22B stores a conventional operating system 35B, illustrated as including a filesystem 126B, a registry 128B, and a process environment and threading subsystems component 130B. The system memory 22B stores the virtualized application file 140, which is configured to execute on the operating system 35A (see FIG. 2) of the client computing device 9 (illustrated in FIG. 1), optionally within a virtual machine implemented by a separate virtual machine executable file, without having been installed on the operating system 35A of the client computing device 9. The virtualized application file 140 may be configured to execute on the operating system 35B of the server computing device 7 (illustrated in FIG. 1), optionally within a virtual machine implemented by a separate virtual machine executable file, but this is not a requirement.

In the embodiment illustrated, the system memory 22B stores web server components 142 configured to implement a web server. The web server components 142 may be configured to provide a web page having one or more links to virtualized application files using standard http protocol. By way of non-limiting examples, the web server components 142 may include Internet Information Services ("IIS") provided by Microsoft Corporation, Apache, and the like. While illustrated as being outside the filesystem 126B, those of ordinary skill in the art appreciate that the virtualized application file 140 and web server components 142 may be conceptualized as being within the filesystem 126B.

The virtualized application file 140 may include components necessary to implement a virtual runtime environment including a virtual operating system 120 configured to execute in the operating system 35A (see FIG. 2) of the client computing device 9 (illustrated in FIG. 1). Alternatively, the virtual runtime environment may be implemented by one of the virtual machine executable files 137 (see FIG. 2). The virtualized application file 140 includes components necessary to implement a virtual application 110 configured to execute in the virtual runtime environment. In particular embodiments, a single virtualized application file is used to implement both the virtual operating system 120 and the virtual application 110. However, those of ordinary skill in the art appreciate that more than one virtualized application file may be used to implement the virtual operating system 120 and the virtual application 110. For example, the components implementing the virtual runtime environment may be stored in one of the virtual machine executable files 137 (see FIG. 2) and the components implementing the virtual application 110 may be stored in the virtualized application file 140. Further, one or more of the files used to implement the virtual application 110 may be other than an executable file having the "exe" file extension.

The virtual operating system 120 includes a virtual filesystem 150, a virtual registry 152, and a virtual process environment and threading subsystems component 154. When executing, the virtual application 110 interacts with the virtual filesystem 150, virtual registry 152, and virtual process environment and threading subsystems component 154, instead of interacting directly with the filesystem 126A, the registry 128A, and the process environment and threading subsystems component 130A of the operating system 35A illustrated in FIG. 2. The virtual operating system 120 is configured to communicate with the operating system 35A illustrated in FIG. 2 as required to execute the virtual application 110.

The virtual application 110 executes inside a virtual runtime environment provided at least in part by the virtual operating system 120. Some virtual applications require one or more additional runtime environments to execute. For example, to execute a Flash application, the Flash runtime engine must also be installed. Therefore, to virtualize a Flash application, both the Flash application and Flash runtime engine must be included in the virtualized application file 140 and configured to execute in the portions of the virtual runtime environment provided by the virtual operating system 120. Collectively, all runtime components necessary to execute the virtual application 110 will be referred to as a virtual runtime engine. When executed, the virtual runtime engine generates, at least in part, the virtual runtime environment in which the virtual application 110 executes.

The virtualized application file 140 includes a configuration data block 121. The configuration data block 121 may include virtual application files 123A-123C corresponding to each of the application files of a natively installed version of the same application. The virtualized application file 140 identifies one or more of the virtual application files 123A-123C as a startup executable that executes when the virtual application 110 is first executed. The startup executable may be identified in the configuration data block 121.

When the virtualized application file 140 is executed, the configuration data block 121 configures the virtual operating system 120 to execute the virtual application 110. For example, the configuration data block 121 may contain configuration information related to files and directories in the virtual filesystem 150, keys and values in the virtual registry 152, environment variables, services, and the like.

The configuration data block 121 may also include basic application metadata and settings such as the application name, application version, and sandbox location. Further, the configuration data block 121 may provide isolation information to the virtual operating system 120. This information indicates which directories, virtual application files 123A-123C, virtual registry entries, environment variables, and services are to be isolated from the operating system 35A (see FIG. 2) of the client computing device 9 (see FIG. 1). While illustrated as being outside the virtual filesystem 150, those of ordinary skill in the art appreciate that the application files 123A-123C may be conceptualized as being within the virtual filesystem 150 when the virtual application 110 is executing.

To execute the virtual application 110, an initialization process is first performed. During this process, the virtual operation system 120 is launched and configured by the configuration data block 121. After the initialization process has completed, the appropriate startup executable(s) is/are launched inside the virtual operating system 120. The virtual operating system 120 intercepts calls to the operating system 35A and routes them to corresponding components of the virtual operating system 120. For example, when the virtual application 110 requests access an application file that corresponds to the virtual application file 123A using a path of a natively installed version of the application, the virtual operating system 120 intercepts the request and routes the request to one of the virtual application file 123A. The virtual operating system 120 may also route some requests and actions to the operating system 35A (see FIG. 2) of the client computing device 9 (see FIG. 1) for processing.

U.S. patent application Ser. No. 12/188,155, filed on Aug. 7, 2008, U.S. patent application Ser. No. 12/188,161 filed on Aug. 7, 2008, and U.S. patent application Ser. No. 12/685,576 filed on Jan. 11, 2010, all of which are incorporated herein by reference in their entireties, disclose systems that may be used to create and configure the virtualized application file 140. As described in greater detail in U.S. patent application Ser. Nos. 12/188,155, 12/188,161, and 12/685,576, the virtualized application file 140 may be created by a virtual application executable constructor or authoring tool 170 using an application template that includes copies of files, such as a configuration file 202, application files 111A-111C, and the like, used to configure the virtualized application file 140. However, the template is not a requirement. Instead, to build the virtualized application file 140, the authoring tool 170 needs only the configuration file 202 and copies of any applications files 111A-111C necessary for a natively installed version of the application to execute. The applications files 111A-111C, and the configuration file 202 are referred to collectively as an application configuration 171. In some embodiments, the authoring tool 170 combines the application configuration 171 and the components of the virtual runtime engine (e.g., the virtual operating system 120) into an executable virtualized application file. However, in other embodiments, the authoring tool 170 omits the components of the virtual runtime engine from the virtualized application file to create a virtualized application file for execution by a virtual machine implemented by a virtual machine executable file, such as one of the virtual machine executable files 137.

For ease of illustration, the authoring tool 170 and the application configuration 171 have been illustrated as being stored in the system memory 22B of the server computing device 7 (see FIG. 1). However, this is not a requirement. As is apparent to those of ordinary skill in the art, the virtualized application file 140 may be created on a computing device other than the server computing device 7, such as the computing device 11 illustrated in FIG. 1, and transferred to the server computing device 7 illustrated in FIG. 1 for storage thereon.

The authoring tool 170 may also be used to create a user interface ("UI") configuration file 169. The UI configuration file 169 may be a separate file or included in the application configuration 171. The UI configuration file 169 may be downloaded along with the virtualized application file 140 or incorporate therein.

Returning to FIG. 2, as mentioned above, the system memory 22A of the client computing device 9 (see FIG. 1) stores the Client Application 132 and the Sandbox Manager 134.

Client Application

The Client Application 132 translates user commands (button clicks, etc) into requests for operations that the Sandbox Manager 134 performs. In embodiments in which the Client Application 132 is implemented as a web browser, the browser plug-in 136 or other type of translation application may be installed on the client computing device 9 (see FIG. 1). Together the browser and browser plug-in 136 perform the functions of the Client Application 132.

By way of a non-limiting example, the browser plug-in 136 may be installed on the client computing device 9 (see FIG. 1) by placing a dynamic link library ("dll") implementing the plug-in 136 in a predetermined installation directory The requests include commands and optionally, one or more parameters. The requests may be implemented as strings, each including a command. If the request also includes parameters, the parameters may be separated from one another and the command by a predetermined character, such as a semi-colon, comma, and the like. In other words, the request may be implemented as a semi-colon delimited string or a string delimited in another manner. The following Table A provides a list of commands that my be included in a request.

TABLE A

| Command | Parameters | Description of Command |
| --- | --- | --- |
| ping | None | Commands the Sandbox Manager 134 to return a predetermined value. For example, the ping command may command the Sandbox Manager to return a predetermined string (e.g., "TRUE") |
| start | an application identifier | Commands the Sandbox Manager 134 to start the transfer of the virtualized application file 140 identified by the application identifier to the client computing device |
| status | session identifier | Commands the Sandbox Manager 134 to provide current status of the transfer of the virtualized application file 140 identified by the session identifier |
| progress | session identifier | Commands the Sandbox Manager 134 to provide current progress of the transfer of the virtualized application file 140 identified by the session identifier. The progress may be indicated as percentage of the virtualized application file 140 transferred (e.g., 10%, 25%, and 100%). |
| exec | session identifier; and optionally, command-line arguments | Commands the Sandbox Manager 134 to execute the virtual application 110 implemented at least in part by the virtualized application file 140 identified by the session identifier that was transferred previously to the client computing device 9 illustrated in FIG. 1 | and registering the dll (i.e., an assembly) in the registry 128A (e.g., a Windows registry) of the client computing device 9 (see FIG. 1). An Assembly Registration tool (e.g., Regasm.exe) may be used to register the dll in the registry 128A.

Once the plug-in 136 has been installed, the plug-in can be used by a website (implemented by the web server components 142 (see FIG. 3) of the server computing device 7 illustrated in FIG. 1) via client-scripting technologies, such as client-side javascript code executing in the Client Application 132. To access the plug-in 136 from the server computing device 7 illustrated in FIG. 1, a plug-in object reference is created and sent to the Client Application 132.

In response to receiving the reference to the plug-in 136, the Client Application 132 loads the plug-in by mime-type, ProgID, class GUID, and the like depending on the implementation details of the Client Application 132 (which in this embodiment, is implemented as a web browser). The plug-in 136 exposes methods which can be used to send requests to the Sandbox Manager 134.

Figure 15:
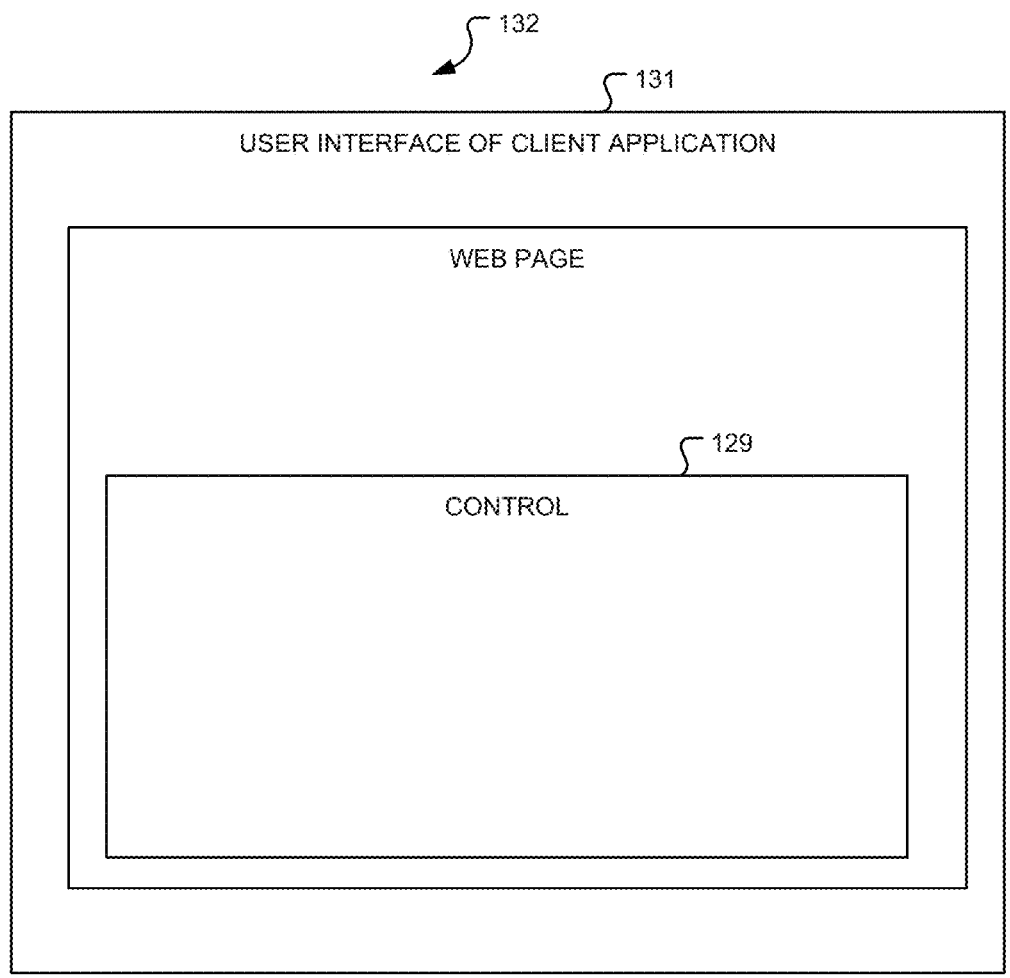
FIG. 15 is block diagram illustrating a control displayed by the Client Application.

The Client Application 132 has a user interface module 133 (see FIG. 2) that generates a user interface 131 (see FIG. 15). In the embodiment illustrated, the user interface 131 displays a web page. The user interface 131 may include one or more conventional windows. A control 129 may be displayed in the Client Application 132. For example, in embodiments in which the Client Application 132 is a web browser, a window of the web browser may display a web page displaying the control 129 displayed as a rectangular region. The control 129 may be implemented by the plug-in 136 (see FIG. 2).

As mentioned above, the Client Application 132 communicates with the Sandbox Manager 134 over the communication link 138, which may be implemented as a TCP connection. By way of a non-limiting example, the Client Application 132 may send the requests as text messages using TCP protocol to the Sandbox Manager 134 over the TCP connection. As described above, each of the requests includes a command and may include one or more parameters (e.g., a parameter list). These commands may be characterized as a communication protocol between the Client Application 132 and the Sandbox Manager 134.

Figure 4:
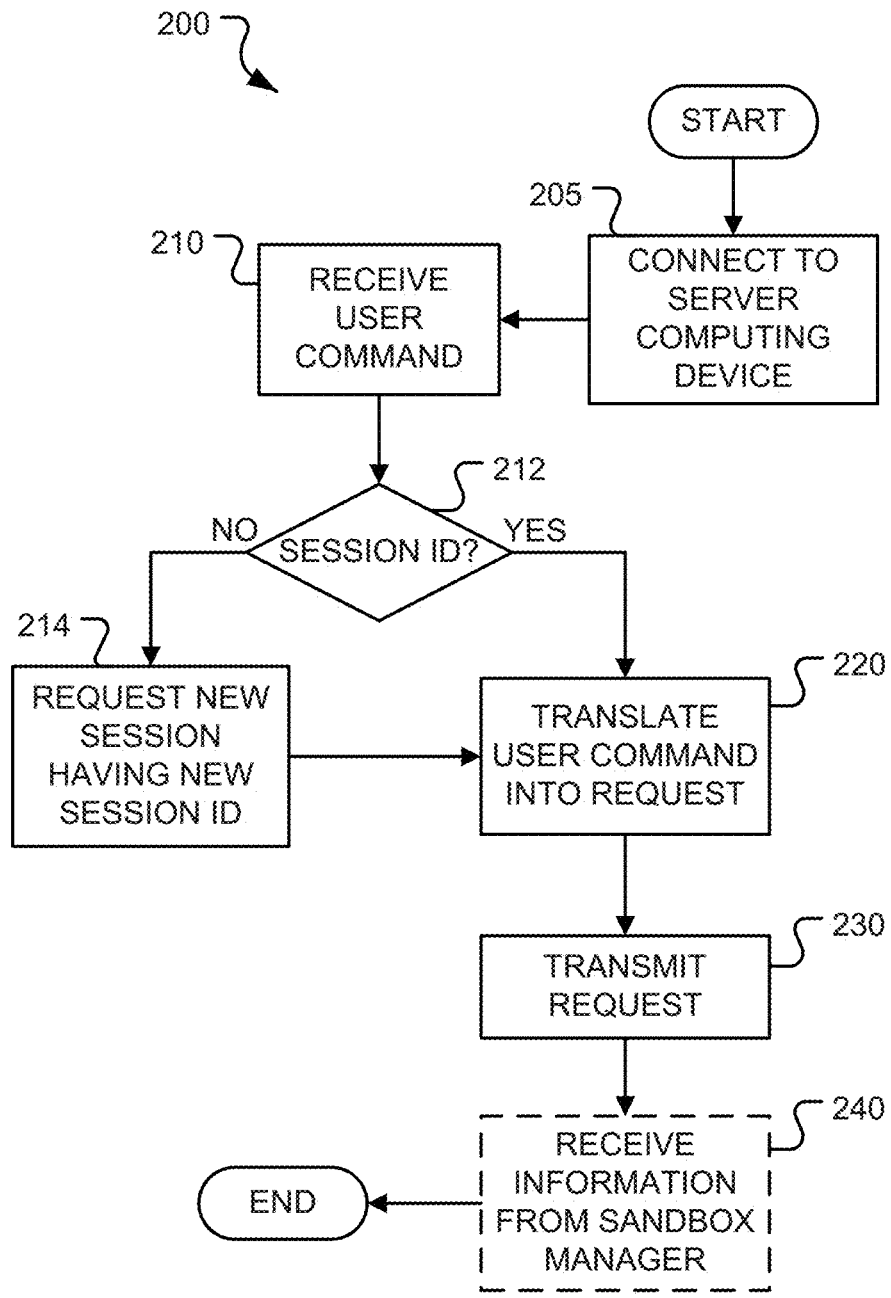
FIG. 4 is a flow diagram of a method performed by the Client Application of FIG. 2.

FIG. 4 provides a flow diagram of a method 200 performed by the Client Application 132 illustrated in FIG. 2. In first block 205, the Client Application 132 connects with the server computing device 7 illustrated in FIG. 1. In embodiments in which the server computing device 7 includes the web server components 142 that implement a website, and the Client Application 132 is a web browser in which the plug-in 136 is installed, in block 205, the Client Application 132 connects to the server computing device 7 over the network 10, and downloads a webpage from the website. The webpage includes a reference to the plug-in 136. When the Client Application 132 receives the reference to the plug-in 136, the Client Application 132 loads the plug-in 136.

In block 210, the Client Application 132 receives a command from the user via a conventional user interface (e.g., a mouse, keyboard, and the like). The user command instructs the Client Application 132 to download the virtualized application file 140 and/or execute the virtualized application file 140.

The plug-in 136 is configured to request a different session for each virtualized application file being transferred and/or executed. Thus, each virtualized application file being transferred and/or executed may be identified by a unique session identifier.

In decision block 212, the plug-in 136 determines whether a session identifier is associated with the virtualized application file 140. The decision in decision block 212 is "YES" when a session identifier is associated with the virtualized application file 140. The decision in decision block 212 is "NO" when a session identifier is not associated with the virtualized application file 140.

When the decision in decision block 212 is "NO," in block 214, the plug-in 136 requests a new communication session having a unique session identifier with the Sandbox Manager 134 over the communication link 138. Then, the Client Application 132 advances to block 220.

When the decision in decision block 212 is "YES," the Client Application 132 advances to block 220.

In block 220, the Client Application 132 translates the user command received in block 210 into a request to be sent to the Sandbox Manager 134 over the communication link 138. For example, in embodiments in which the Client Application 132 is a web browser in which the plug-in 136 is loaded, in block 210, the web browser receives the user command (e.g., the user clicks on a hyperlink, presses a button, and the like) and in block 220, the plug-in 136 translates the user command into a request including a command (e.g., one of the commands listed in Table A above) and optionally, one or more parameters (e.g., the session identifier associated with the virtualized application file 140). The user command may be an instruction to download the virtualized application file 140 (see FIG. 3), an instruction to execute the virtualized application file 140, and the like. As mentioned above, the request may be a string including the command and parameters, if any.

Returning to FIG. 4, in block 230, the Client Application 132 transmits the request to the Sandbox Manager 134 over the communication link 138 (e.g., a TCP connection) illustrated in FIG. 2. Optionally, in block 240, the Client Application 132 may receive information from the Sandbox Manager 134. The information received may be a response to the command (e.g., a response to a "ping" command), a result of performing the command, status and/or progress information related to performing a command, an error message, and the like. Then, the method 200 terminates.

Sandbox Manager

Figure 5:
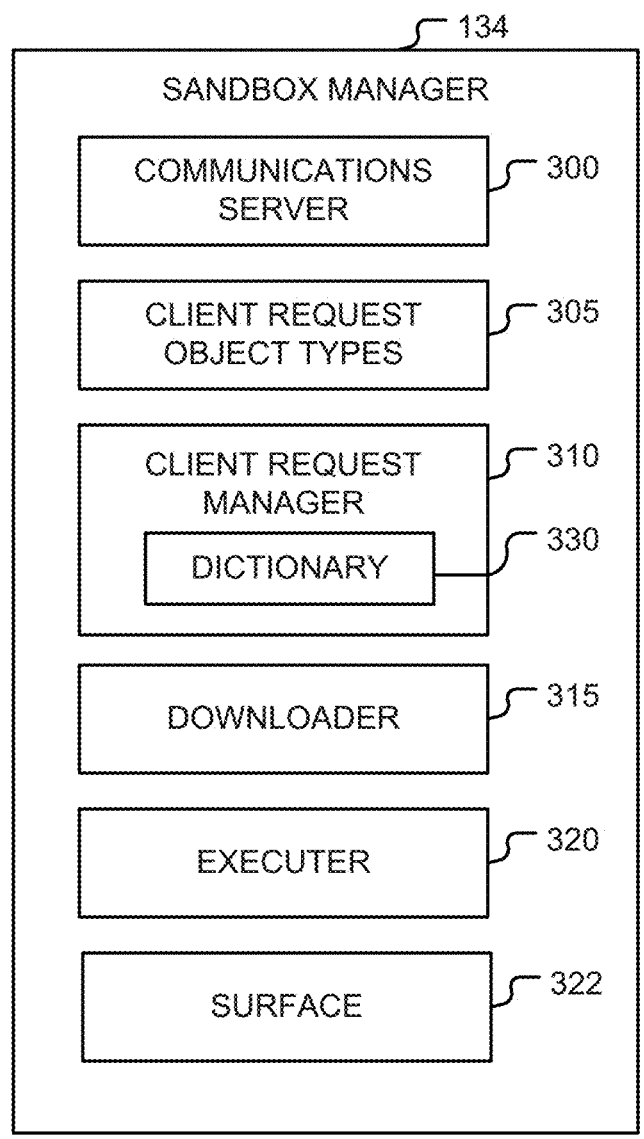
FIG. 5 is a diagram illustrating the components of the Sandbox Manager of FIG. 2.
Figure 9:
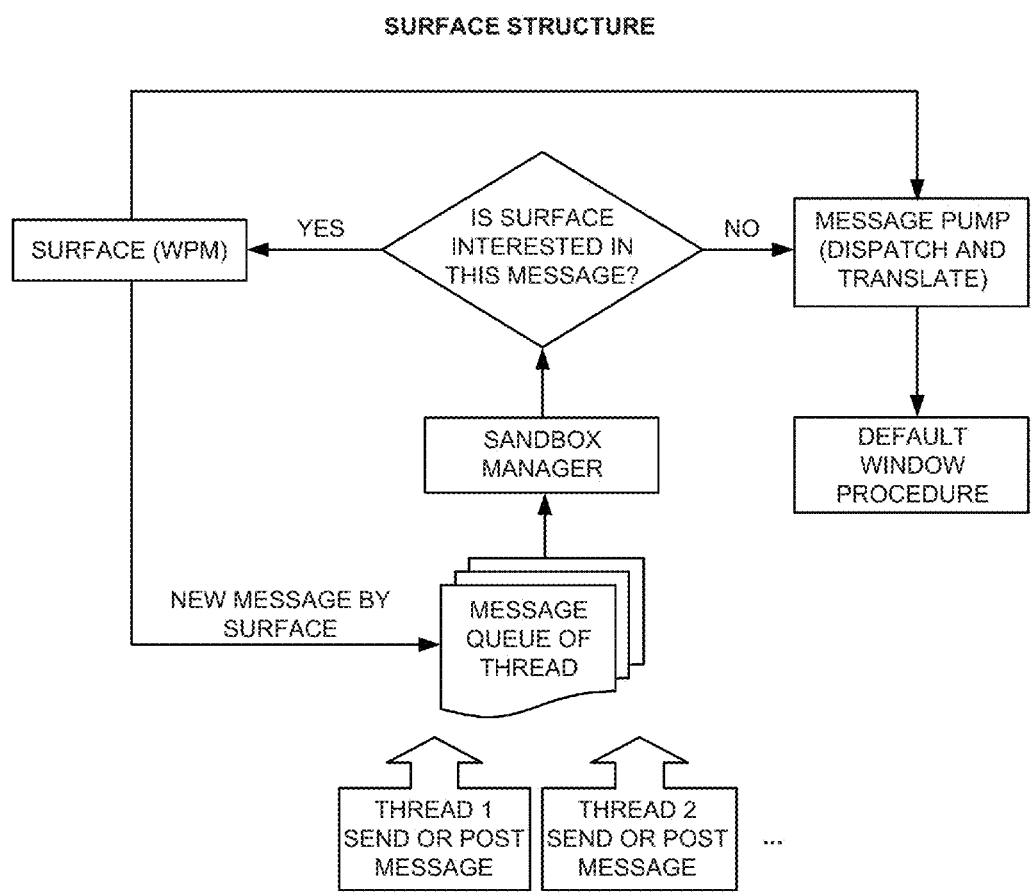
FIG. 9 is a diagram illustrating some of the structural components of an exemplary implementation of a user interface manager component of the Sandbox Manager referred as a "Surface."

Returning to FIG. 2, the Sandbox Manager 134 receives requests from the Client Application 132 and performs the commands included in the requests. The Sandbox Manager 134 manages the transfer of the virtualized application file 140 (see FIG. 3) from the server computing device 7 to the client computing device 9 illustrated in FIG. 1. The Sandbox Manager 134 also manages execution of the virtual application 110 (see FIG. 3) on the client computing device 9 (see FIG. 1). Turning to FIG. 5, the Sandbox Manager 134 includes a communications server 300 (e.g., a TCP server), one or more predefined Client Request object types 305, a Client Request Manager 310, a Downloader 315, an Executer 320, and a UI manager 322, referred to as a "Surface." FIG. 9 is a diagram illustrating some of the structural components of an exemplary implementation of the Surface 322.

Returning to FIG. 4, as mentioned above, in block 214, the plug-in 136 requests a different communication session having a unique session identifier for each virtualized application file being transferred and/or executed. Referring to FIGS. 2 and 5, in response to each request for a new communication session, the communications server 300 establishes a communication session between the Client Application 132 and the Sandbox Manager 134 and generates a unique session identifier for the new communication session. In this manner, each virtualized application file being transferred and/or executed may be identified by a unique session identifier.

Each of the predefined Client Request object types 305 is associated with a particular type of virtualized application file. For example, the Client Request object types 305 include a Client Request object type associated with the virtualized application file 140. The types are used to create a Client Request object for each virtualized application file to be downloaded and/or executed by the Sandbox Manager 134. An object of the Client Request object type associated with the virtualized application file 140 is responsible for managing transfer and execution of the virtualized application file 140, including determining status, managing the cache 139 (see FIG. 2) stored on the filesystem 126A, etc.

The Client Request Manager 310 determines whether a Client Request object has been created for a particular virtualized application file associated with a session identifier. If a Client Request object has not been created for a virtualized application file, the Client Request Manager 310 (see FIG. 5) identifies which of the predefined Client Request object type is configured to manage details about the virtualized application file, creates a Client Request object of the type identified, and associates the Client Request object with the session identifier associated with the virtualized application file. By way of a non-limiting example, a Client Request object may need to be created when the Sandbox Manager 134 receives a "start" command for the first time to start downloading the virtualized application file 140. The Client Request Manager 310 may include a dictionary 330 configured to store Client Request objects for use in performing commands included in requests. The dictionary 330 may be stored in the cache 139 (see FIG. 2) of the filesystem 126A (see FIG. 2).

Each of the Client Request objects includes a status field indicating a status related to the transfer and/or execution of the virtualized application file. Table B below provides non-limiting examples of status values or codes that may be stored in the status field.

TABLE B

| Status Code | Description |
| --- | --- |
| Not Started | Transfer of virtualized application file is currently being initialized. |
| In Progress | Transfer of virtualized application file is currently in progress. |
| Complete | Transfer of virtualized application file has completed and the virtualized application file is ready to execute. |
| Canceled | Transfer of virtualized application file has been cancelled. Transfer may be canceled by a request from the Client Application 132. Alternatively, transfer of virtualized application file may be canceled by an internal operation of the Sandbox Manager 134. |
| Error | Transfer of virtualized application file has been aborted due to an error. An error code may be sent to the Client Application 132. For example, an error code may be encoded in high-order bits of a message sent in response to the "start" command. Table C below provides a non-limiting exemplary list of error codes. |

The status field may be set to "Canceled" when user exits the web page (e.g., browses to another page, closes the browser window, and the like) on which the link to the virtualized application file being downloaded is displayed. By way of a non-limiting example, when the user exits the web page, a cancel call may be created automatically (e.g., by script code executing in the Client Application 132) and sent to the plug-in 136. In response, the plug-in 136 sends a cancel message including the session identifier (e.g., "cancel;<session id>") to the Sandbox Manager 134 over the communication link 138. If the status value of the status field of the Client Request object including the session identifier in the cancel message is "In Progress," the transfer is cancelled by the Sandbox Manager 134.

By way of a non-limiting example, the status value of the status field may be determined in the following manner. If the transfer of the virtualized application file has not yet started, the current status is "Not Started." If the transfer has started and is in progress, the current status is "In Progress." If the transfer has started, is not in progress, and has completed, the current status is "Complete." If the transfer has started, is not in progress, has not completed, and has been canceled, the current status is "Canceled." If the transfer has started, is not in progress, has not completed, has not been canceled, and has encountered an error, the current status is "Error." Table C below provides a non-limiting example of error codes that may used by the Sandbox Manager 134.

TABLE C

| Error Code | Description |
| --- | --- |
| None | No error occurred. |
| Unknown | An unknown error occurred. |
| Invalid Session Id | Session identifier is not valid. |
| Network | An error occurred during transfer of the virtualized application file. |
| Invalid Source | The source path of the virtualized application file (or one of its dependencies) is not valid (e.g., the path is not in the correct format). |

Each of the Client Request objects includes a progress field indicating an amount (e.g., a percentage from 0% to 100%) of the virtualized application file stored in the cache 139 (see FIG. 2) of the filesystem 126A (see FIG. 2).

Each of the Client Request objects may include a path to the transferred virtualized application file stored on the cache 139 (see FIG. 2) of the filesystem 126A (see FIG. 2).

The Downloader 315 downloads a particular virtualized application file identified by a session identifier.

The Executer 320 executes a particular virtualized application file identified by a session identifier.

The virtual runtime engine is configured to capture user interface messages (or API calls) made by an executing virtual application (e.g., the virtual application 110) and forward them to the Surface 322. The Surface 322 processes or translates these messages into user interface commands sent to the Client Application 132. For example, the virtual runtime engine may capture a message to create a new window and display particular content therein made by an executing virtual application (e.g., the virtual application 110) and instead of generating a new window, the virtual runtime engine forwards the message to the Surface 322. The Surface 322 may render the particular content inside the control 129 (see FIG. 15). By way of non-limiting examples, the messages may include modifications to previously created windows (e.g., hide, change style, etc).

The Surface 322 may use the region occupied by the control 129 as a desktop area that will host the application's user interface (e.g., windows). The control 129 may be used by any window in the current window desktop session.

The Surface 322 includes one or more Listeners. Listeners are objects or procedures that are used to process events generated by the virtual application 110. Each Listener has one or more conditions that indicate which messages the Listener will process. For example, if the virtual application 110 makes a call to a SDK exposed function to open a new window (i.e., calls a window procedure), the virtual runtime engine forwards the request to the Surface 322. The Surface 322 determines whether it has loaded a Listener configured to process a new windowing message. In other words, the Surface 322 determines whether the new message request satisfies the condition(s) of any of the Listeners. By way of a non-limiting example, Table D below provides a list of Listeners that may be implemented by the Surface 322. Some of the Listeners in Table D are configured to receive data (e.g., a Windows Message ID value as defined in winuser.h in the Windows SDK).

As mentioned above, the Surface 322 may use a UI configuration file 169 to generate the UI in the control 129. The UI configuration file 169 does not describe how to render the control 129. Instead, the UI configuration file 169 defines rules for how the Surface 322 should render an entire window. For example, the UI configuration file 169 may indicate that a particular window should be rendered inside the Surface 322 or outside the Surface 322. By way of another non-limiting example, the UI configuration file 169 may indicate whether to show or hide a window's title bar. The UI configuration file 169 may have been downloaded by the Downloader 315 along with a particular virtualized application file identified by a session identifier.

UI Configuration File

Figure 10:
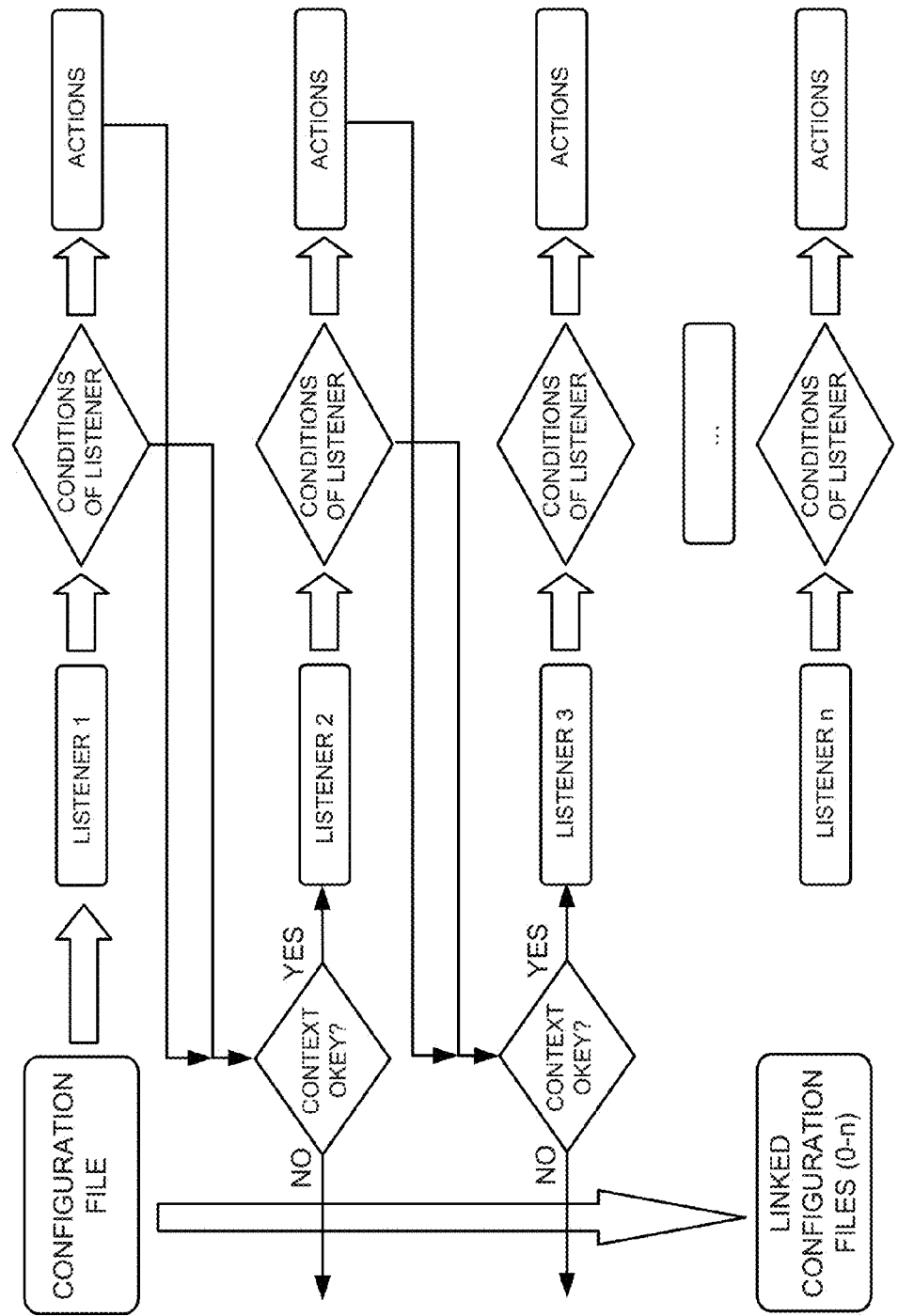
FIG. 10 illustrates an implementation of the user interface configuration file used to configure the Surface.

FIG. 10 illustrates an implementation of the UI configuration file 169. The UI configuration file 169 may be implemented as an XML file. However, this is not a requirement. The UI configuration file 169 includes information for configuring the following six types of objects.
1. Imports
2. Inherited Configuration Files
3. Variables
4. Listeners
5. Action Packs
6. Condition Packs 1. Imports An import object type identifies one or more extension code assemblies that include additional objects to be loaded by the Surface 322 during initialization. In this way, developers may extend the information directly embedded in the UI configuration file 169 by writing extension code assemblies (e.g., dlls) and identifying them in the UI configuration file 169 using import type objects. For each import type object, the Surface will automatically load the extension code assembly identified and resolve custom conditions, data objects, or actions specified in the extension code assembly.

An import type object has the following four properties: AssemblyName; Namespace; LoadType; and ResolveReferences. The AssemblyName property specifies the name of an extension code assembly including developer specified (or custom) conditions, data objects, or actions. The Namespace property specifies the namespace of the extension code assembly. The LoadType property specifies assembly load behavior. Load behaviors may include Never, Auto, and Lazy types. Never indicates the extension code assembly will never be loaded. Auto indicates loading will be performed when the extension code assembly identified by the import type object is needed. Lazy indicates loading will be performed when the UI configuration file 169 is resolved.

As is apparent to those of ordinary skill in the art, extension code assemblies identified in an import type object may include references to additional extension code assemblies. Thus, a tree structure of extension code assemblies (a "extension code assembly dependency tree") may be specified by the UI configuration file 169. The ResolveReferences property of an import type object indicates how extension code assemblies referenced by a particular (or parent) extension code assembly will be resolved. The value specified may be None, All, and OneMoreStep. The value "None" indicates none of the referenced extension code assemblies will be resolved. The value "All" indicates all of the referenced extension code assemblies (i.e., the entire extension code assembly dependency tree) will be resolved. OneMoreStep indicates only referenced extension code assemblies of the current assembly will be loaded, any extension code assemblies identified in the referenced extension code assemblies will be ignored.

The following example XML code may be used to define an import type object in the UI configuration file 169.

```
<Imports>
    <Import AssemblyName="Xenocode.WPM"
        Namespace="Xenocode.WPM.ObjectModel"
        LoadType="Auto" ResolveReferences="All" />
</Imports>
```

2. Inherited Configuration Files

The UI configuration file 169 can be linked to other UI configuration files to support reusability of existing UI configuration files. An inherited file type object is used to identify the linked UI configuration files. Listeners, actions packs, and condition packs defined in inherited UI configuration files may be loaded by the Surface session.

Like the import object types, the inherited configuration files may also define a tree structure (an "inheritance dependency tree") because an inherited file type object may include one or more inherited file type objects. The surface configuration inheritance is deep tree. In other words, all of the UI configuration files in the inheritance dependency tree may be loaded. The following example XML code may be used to define an inherited file type object in the UI configuration file 169.

```
<Surface Name="DefaultChild" Version="1.5">
    <Inherits>
        <Inherit Name="Default"
            Path="default13.xml" />
    </Inherits>
    ...
```

The same inherited UI configuration file can be linked to the UI configuration file 169 more than once to create multiple instances of the same inherited UI configuration file. The following example XML code demonstrates the inclusion of a first reference (included in a first inherited file type object) and a second reference (included in a second inherited file type object) to the same inherited UI configuration file in the UI configuration file 169.

```
<Surface Name="DefaultChild" Version="1.5">
    <Inherits>
        <Inherit Name="Default"
            Path="default13.xml" />
        <Inherit Name="Default2_Instance"
            Path="default13.xml" />
    </Inherits>
    ...
```

Information and/or objects included in an inherited UI configuration file may be accessed by using the name of the inherited file type object and the name of the item to be accessed. For example, the XML code below includes, an inherited file type object named "default" that includes a condition named "ValidateIsModalDialog." The condition "ValidateIsModalDialog" is accessed in the XML below as "Default.ValidateIsModalDialog." All members of an inherited file type object, such as inherited file type objects, Variables, Listeners, Actions Packs, and Condition Packs, and the like can be accessed by this way.

```
<Surface Name="Default Ignore Modal Dialog Validations"
    Version="1.5">
    <Inherits>
        <Inherit Name="Default"
            Path="default13.xml" />
    </Inherits>
    <Listeners>
        <Listener Type="AfterStart"
            Enabled="True">
            <Action Type="ActionGroup"
                BreakOnError="False">
                <Action Type="Assignment">
                    <Left
                        Type="DataVariable"
                        Name="Default.ValidateIsModalDialog">
                    </Left>
                    ...
```

3. Variables

A variable collection object is a collection of variables. Variables are data storage objects used to store data. Depending upon the implementation details, it may be desirable for each of the variables to have a unique name. However, the same name may be given to two or more different variables in the different UI configuration files even if they are linked together as described above. Any type of data may be stored in a variable. Further, an initial value may be specified for a variable.

The variable collection object may include a "Locked" property. If the "Locked" property is set to "FALSE," the Surface 322 can add variables to or remove variables from the variable collection object during runtime. Otherwise, if the "Locked" property is set to "TRUE," the Surface 322 cannot add variables to or remove variables from the variable collection object during runtime.

Each variable may include a "ReadOnly" attribute. If the ReadOnly attribute is set to "TRUE," the data stored in the variable cannot be modified. Otherwise, if the ReadOnly attribute is set to "FALSE," the data stored in the variable can be modified. The variables need not be strongly typed. Therefore, the data type of a variable may be changed so that any data may be stored in any variable. The following example XML code may be used to define a variable collection object and the variables in the collection in the UI configuration file 169.

```
<Surface Name="Default" Version="1.5">
    ...
    <Variables Locked="False">
        <Variable Name="SurfaceHandle"
            ReadOnly="False">
        </Variable>
        <Variable Name="ProcessId" ReadOnly="False"></Variable>
        <Variable Name="IsChildWindow"
            ReadOnly="False">False
        </Variable>
    </Variables>
    ...
```

A variable may be accessed using a Data type object (discussed in more detail below) of the type "DataVariable." The XML code below illustrates how a Data type object having the type "DataVariable" accesses a variable named "SurfaceHandle." In the XML code, the name attribute of the DataVariable type object is set to the name ("SurfaceHandle") of the variable. The DataVariable type object may be used to change the value of the variable "SurfaceHandle."

```
...
<Action Type="Assignment">
    <Left Type="DataVariable"    Name="SurfaceHandle"></Left>
    <Right Type="DataSurface"    Name="Container"></Right>
</Action>
...
```

As demonstrated in the XML code below, variables may be accessed in inherited UI configuration files using the name of the inherited file type objects.

```
<Inherits>
    <Inherit Name="NoResizable" Path="noresizable.xml" />
</Inherits>
...
<Left Type="DataVariable" Name="NoResizable.Enabled"></Left>
...
```

Depending upon the implementation details, there may be no visibility limitations for the variables. In such implementations, the variables may be characterized as public members of the UI configuration file.

4. Listeners

As mentioned above, the Surface 322 includes one or more Listeners that process events generated by the virtual application 110. The UI configuration file 169 may include one or more Listener type objects used to configure the Listener(s) of the Surface 322. Table D below provides non-limiting examples of types of Listener type objects.

TABLE D

| Listener Type | When Invoked | Data |
|---|---|---|
| BeforeStart | before the Surface has started to work | Not Supported |
| AfterStart | after the Surface has started to work | Not Supported |
| BeforeStop | before the Surface is stopped | Not Supported |
| AfterStop | after the Surface is stopped | Not Supported |
| MainWindowChanged | when MainWindow property of the Surface is changed. | Not Supported |
| WindowCreate | when a new Window is created in the target application | Not Supported |
| WindowMessage | when a new windowing message is sent to any window of the hosted application (e.g., the virtual application 110) | Windows Message ID |
| SurfaceWindowMessage | when a new windowing message is sent to the Host Panel control (e.g., the control 129) | Windows Message ID |

The Windows Message ID listed in Table D above is defined in winuser.h in Windows SDK (ex: WM_SHOWWINDOW, WM_WINDOWPOSCHANGED, etc.).

Each Listener type object is associated with one or more conditions that indicate which messages the Listener configured by the Listener type object will process. A Listener type object may include one or more Data attributes that are used to determine which events and messages will be handled by the Listener configured by the Listener type object. For example, Listener type objects of the type "WindowMessage" include the Data attribute "Windows Message ID." A MainWindow is the window whose properties can be shared between the Listeners during the lifetime of the Surface.

Depending upon the implementation details, the UI configuration file 169 may not define any Listener type objects. The UI configuration file 169 may include one or more Listener type objects of the same type. In such situations, the Surface 322 may invoke the Listeners defined by the Listener type objects in the order they are listed in the UI configuration file 169.

As demonstrated in the following XML code, each of the Listener type objects may include an Enabled attribute that indicates whether the Listener defined by the Listener type object is enabled or disabled at that moment. If the Listener is disabled, the Surface will ignore the Listener and not trigger it.

```
<!--
    WM_SHOWWINDOW (24) Listener, which is invoked
    when a window is going to be shown or hidden
-->
<Listener Type="WindowMessage" Data="24" Enabled="True">
    ...
</Listener>
```

Each of the Listener type objects may be associated with a Condition object and/or an Action object. The Condition object specifies one or more conditions to be satisfied. The Action object specifies one or more actions to be performed. If a Condition object and an Action object are associated with the Listener type object and the one or more conditions of the Condition object are satisfied, the one or more actions of the Action object are performed. If a Condition object and an Action object are associated with the Listener type object but the one or more conditions of the Condition object are not satisfied, the Listener defined by the Listener type object is ignored and the one or more actions of the Action object are not performed. If an Action object is associated with the Listener type object but no Condition objects are associated with the Listener type object, the one or more actions of the Action object are performed.

The process of determining whether the one or more conditions of the Condition object are satisfied is referred to as "validation." Condition objects may return TRUE or FALSE as the result of the validation. Each Condition object may have its own validation method(s).

The following XML code provides two non-limiting examples of Condition objects. Both Condition objects are type "BooleanCondition." Each Condition object specifies a "Left" value, a "Right" value, and an Operator. Table E below provides a non-limiting list of operators that may be used by the Condition objects. In the XML code below, the first Condition object returns TRUE if the "Left" and "Right" values are equal. Thus, the first Condition object returns TRUE if the data window is the main window. The second Condition object returns TRUE if the "Left" value is smaller than the "Right" value. Thus, the second Condition object returns TRUE if the x component of the location of the data window is less than five.

```
<Condition Type="BooleanCondition" Operator="Equal">
    <Left Type="DataWindow" Name="IsMainWindow"></Left>
    <Right Type="DataConstant">True</Right>
</Condition>
<Condition Type="BooleanCondition" Operator="SmallerThan">
    <Left Type="DataWindow" Name="Location.X"></Left>
    <Right Type="DataConstant">5</Right>
</Condition>
```

Depending upon the implementation details, the Surface 322 may have an automatic type resolution system that converts data to a target type before using the data. Therefore, when comparing values having two different data types, the Surface 322 may convert the data type of one of the values (e.g., the "Right" value) into the data type of other values (e.g., the "Left" value).

A ConditionGroup type object may be used to associate multiple Condition objects with a Listener type object. For example, the XML code below includes two ConditionGroup type objects. The first ConditionGroup type object returns TRUE when both the first Condition object and the second Condition object embedded in the first ConditionGroup type object return TRUE. The second ConditionGroup type object returns TRUE when either the first Condition object or the second Condition object embedded in the second ConditionGroup type object return TRUE.

```
<Condition Type="ConditionGroup" Combination="And">
    <Condition Type="BooleanCondition" Operator="Equal">
        <Left Type="DataVariable"
            Name="EnableWindowCreateListener"></Left>
        <Right Type="DataConstant">True</Right>
    </Condition>
    <Condition Type="PackedConditionCaller"
        Name="IsTargetWindow">
    </Condition>
</Condition>
<Condition Type="ConditionGroup" Combination="Or">
    <Condition Type="BooleanCondition" Operator="Equal">
        <Left Type="DataVariable" Name="CaptionVisible"></Left>
        <Right Type="DataConstant">True</Right>
    </Condition>
    <Condition Type="BooleanCondition" Operator="Equal">
        <Left Type="DataVariable" Name="BorderVisible"></Left>
        <Right Type="DataConstant">True</Right>
    </Condition>
</Condition>
```

Table E below provides non-limiting examples of Condition object types that may be included in the UI configuration file 169.

TABLE E

| Condition Object Type | Operators | Parameters | Description |
| --- | --- | --- | --- |
| BooleanCondition | See Table F | Left: Any data object Right: Any data object | Compares Left and Right Boolean values according to the operator. |
| StringCondition | See Table F | Left: Any data object Right: Any data object | Compares Left and Right data's according to the operator. Comparison will be done according to the defined StringComparision value. |
| IntegerCondition | See Table F | Left: Any data object Right: Any data object | Compares Left and Right integer values according to the operator. |
| UIntegerCondition | See Table F | Left: Any data object Right: Any data object | Compares Left and Right unsigned integer values according to the operator. |
| IntPtrCondition | See Table F | Left: Any data object Right: Any data object | Compares Left and Right IntPtr values according to the operator. |
| DoubleCondition | See Table F | Left: Any data object Right: Any data object | Compares Left and Right double values according to the operator. |
| ComparableCondition | See Table F | Left: Any data object which is IComparable Right: Any data object | Compares data objects by using IComparable.CompareTo method. |
| ConditionGroup | See Table G | | Runs all inner conditions and combine them according to the Combination mode and returns the result |
| PackedConditionCaller | | Name: Name of a condition pack | Runs the condition pack which is defined by the name and returns the result of it |

TABLE E-continued

| Condition Object Type | Operators | Parameters | Description |
|---|---|---|---|
| IsMyWindow | | Data: Current window | Validates that is current window which cause this Listener invoked is belongs to the host application. |

In addition to the Condition object types listed in Table E, the Surface 322 may also include one or more abstract base classes. Custom Condition objects may be implemented by inheriting from these abstract base classes.

Table F below lists condition operators.

TABLE F

| Condition Operator | Description |
|---|---|
| Equal | Returns true if Left and Right data objects are same. Otherwise returns false. |
| NotEqual | Returns true if Left and Right data objects are not same. Otherwise returns false. |
| StartsWith | Returns true if the Left data objects is starts with the Right data object. Otherwise it returns false. This ConditionOperator can only be used with the StringCondition condition type. |
| EndsWith | Returns true if the Left data object is ends with the Right data object. Otherwise it returns false. This ConditionOperator can only be used with the StringCondition condition type. |
| BiggerThan | Returns true if the Left data object is bigger than the Right data object. Otherwise it returns false. |
| SmallerThan | Returns true if the Left data object is smaller than the Right data object. Otherwise it returns false. |
| BiggerOrEqual | Returns true if the Left data object is equal or bigger than the Right data object. Otherwise it returns false. |
| SmallerOrEqual | Returns true if the Left data object is equal or smaller than the Right data object. Otherwise it returns false. |
| Contains | Returns true if Left data object contains Right data object in it. Otherwise it returns false. This ConditionOperator can only be used with the StringCondition condition type. |

Table G below lists combination operators for use by ConditionGroup type objects.

TABLE G

| Combination Operator | Description |
|---|---|
| And | Returns true if all the inner conditions returns true. Otherwise it returns false. |
| Or | Returns true if at least one of the inner conditions returns true. Otherwise it returns false. |

Data type objects are used to define DataObjects that are used to retrieve, set, and/or modify data values. The following XML code provides a non-limiting example of a Data type object. The Data type object has a type "DataSurface" and stores the "WindowHistories.SaveState." The Data type object defines two parameters (a constant "DataConstant" and a "DataWindow" parameter) and sets the value of a parameter type "DataConstant" to "First State." The "DataWindow" parameter stores the value of the "Handle" of the "DataSurface" named "WindowHistories.SaveState."

```
<Data Type="DataSurface" Name="WindowHistories.SaveState">
    <Parameter Type="DataConstant">First State</Parameter>
    <Parameter Type="DataWindow" Name="Handle"></Parameter>
</Data>
```

The following XML code provides additional non-limiting examples of Data type objects. As is apparent to those of ordinary skill in the art, the XML code below defines only portions of Condition type objects and are not complete definitions thereof.

```
<Right Type="DataObject" Name="#5">
    <Data Type="DataSurface" Name="WindowHistories.GetState">
        <Parameter Type="DataWindow" Name="Handle"></Parameter>
        <Parameter Type="DataConstant">First State</Parameter>
    </Data>
</Right>
<Left Type="DataConstant">False</Left>
<Left Type="DataVariable" Name="Default.ProcessId"></Left>
<Right Type="DataTypedObject" TypeName="CommonOperations" Name="Sum">
    <Parameter Type="DataWindow" Name="Width"></Parameter>
    <Parameter Type="DataConstant">15</Parameter>
</Right>
```

The Surface 322 may change the type of data to match the data type of a DataObject. The Surface 322 may use simple and/or complex data types. Data type objects may be used to access a DataObject itself or any member (method, constructor, field, property) of that DataObject.

Data type objects are generally used in Condition parameters, Action parameters, DataObject parameters etc. in the Surface. Table H below lists non-limiting examples of types of Data type objects.

TABLE H

| Data Object Type | Parameters | Description |
|---|---|---|
| DataConstant | | Any Constant data. |
| DataVariable | Name: The fully qualified name of the Variable | Used to access any variable in the configuration object. It is also allows access any inherited configuration variables with this data type. The name is fully qualified ([name of inherited config].[name of element]). |
| DataWindow | Name: The fully qualified name of the | Used to access any member in the ProxyWindow instance of the Window |

TABLE H-continued

| Data Object Type | Parameters | Description |
| --- | --- | --- |
| | member in the ProxyWindow | which is in the current listener context. |
| DataContext | Name: Path of the member in the ListenerContext | Used to access any member in the current ListenerContext instance |
| DataCondition | Condition: Inner condition object | Gets the inner condition result as the data |
| DataObject | Data: Inner data object | Gets the result of the inner data object as the data |
| DataSurface | Name: Path of the member in the Surface | Used to access any member in the Surface. |
| DataTypedObject | Name: Path of any class and its member | Invokes any member of any class and gets the result as the data. |

The Data type objects listed in Table H above may have different structures. For example, a DataVariable type (discussed above) is a reference to a variable and a DataWindow type allows access to a current ProxyWindow object (i.e., the window that triggered the current Listener).

ProxyWindow is a proxy class that can be used to access properties and methods of a Window. These methods and properties are generally sets of windowing message operations that together perform a group (or single) operation on the window. (ex. BorderVisible, CaptionVisible, Location, Bounds etc.)

As mention above, a Listener type object may be associated with one or more Condition objects and/or one or more Action objects. Each Condition object specifies one or more conditions to be satisfied. Each Action object specifies one or more actions that will be performed by the Surface 322.

If the Listener type object is associated with one or more Condition objects, the one or more actions specified by the one or more Action objects associated with the Listener type object will be performed by the Surface 322 only if the conditions specified by the one or more Condition objects are satisfied. Otherwise, if the Listener type object is not associated with one or more Condition objects, the one or more actions specified by the one or more Action objects associated with the Listener type object will be performed by the Surface 322.

However, as demonstrated in the following XML code, Action objects may also be associated with one or more Condition object. Therefore, before the one or more actions specified by the Action object are performed, the conditions specified by the one or more Condition objects associated the Action object must be satisfied (or validated).

```
<Action Type="ActionGroup" BreakOnError="False">
    <Action Type="Assignment">
        <Condition Type="PackedConditionCaller"
            Name="IsResizableWindow"></Condition>
        <Left Type="DataWindow" Name="Size"></Left>
        <Right Type="DataSurface" Name="ContainerSize"></Right>
    </Action>
    <Action Type="Assignment">
        <Left Type="DataWindow" Name="Sizeable"></Left>
        <Right Type="DataConstant">False</Right>
    </Action>
    <Action Type="CenterWindow" Options="CenterParent"
        RePaint="True" />
</Action>
```

Table I below provides non-limiting examples of types of Action objects.

TABLE I

| Action Object Type | Parameters | Description |
| --- | --- | --- |
| Assignment | Left: Any data type<br>Right: Any data type | Assigns Right data to the Left data |
| ActionGroup | | Contains a set of Actions in it, and applies all actions in the given order. |
| BreakAction | | Breaks the current execution stack. |
| CenterWindow | | Centers current Window context in the Host Panel control (e.g., the control 129). |
| CloseWindow | | Closes current Window context |
| EnableListener | Enable: Enable value of the listener<br>ListenerIndex: Index of the listener | Enables/disables the given listener. |
| EnumWindowsAction | WindowSource: Can be one of the following values;<br>AllWindows,<br>CurrentProcess,<br>ProcessById,<br>ProcessByName, | Enumerates windows which have been defined by the window source. |

TABLE I-continued

| Action Object Type | Parameters | Description |
|---|---|---|
| | SavedWindows, CurrentChild | |
| InvalidateWindow | | Invalidates current window. Causes the window to be redrawn. |
| MethodCallAction | Data: Data object which indicates the method | Calls any method. |
| PackedActionCaller | Name: Packed action name | Calls any action pack. |
| SendMessage | Msg: Windowing Message WParam: Any data to identify the wparam LParam: Any data to identify the lparam | Sends a message to the current window. |
| SaveWindowState | Name: Name of the state | Saves current window state as the given state name |
| RestoreWindowState | Name: Name of the state | Restores window's state to the given state |
| ParameterlessMessageAction | Msg: WindowMessage | Sends a windowing message with no parameters to the current window |

When a new Listener event is triggered by the Surface, a ListenerContext object is created. The ListenerContext object contains the data objects that are available during the Listener session. For example, when a new WindowMessage Listener has been triggered, the Surface prepares a ListenerContext object that contains the Message structure and Window instance to which the windowing message that triggered the new WindowMessage Listener belongs.

When a new Listener invocation is triggered, the Surface creates the ListenerContext object, which contains two pieces of information: ListenerType and FilterData. When the Surface enters the Listeners loop (see discussion below of a method 600), the Surface first checks to see that the current Listener has the same ListenerType as the ListenerContext object. If not the Listener will be ignored, otherwise the Surface will try to compare the Data object(s) of the Listener with the FilterData of the ListenerContext object.

ListenerContext objects also manage tracing operations. If an EnableTrace property of the ListenerContext object is TRUE, the Surface will write trace messages to the ListenerContext object during all condition validations and action processing.

ListenerContext objects also have an IsAlive property. This property indicates whether the Surface should continue to run the remaining Listeners. If this value is set to FALSE while a Listener is running, the Surface will stop running the remaining Listeners.

As demonstrated by the XLM code below, the members of the ListenerContext object may be accessed by a Data type object having the type "DataContext."

```
<ConditionPack Name="IsShowWindowMessage">
    <Condition Type="IntPtrCondition" Operator="NotEqual">
        <Left Type="DataContext"
            Name="HookedMessage.wParam"></Left>
        <Right Type= "DataConstant">0</Right>
    </Condition>
</ConditionPack>
<ActionPack Name="Break">
    <Action Type="Assignment">
        <Left Type="DataContext" Name="IsAlive"></Left>
        <Right Type="DataConstant">False</Right>
    </Action>
</ActionPack>
```

When the UI configuration file 169 includes inherited file type object, the Surface runs the Listener(s) of the UI configuration file 169 first. Then, the Surface 322 runs the Listeners of the inherited configurations.

5. Action Packs

An ActionPack object is a collection or set of Action objects packaged together to form a single action. An ActionPack object may be called by different Listeners. Thus, instead of including the same set of actions in the Action objects (e.g., action tags) of multiple Listener type objects, a single set of actions can be included in an ActionPack object and called as a unit by different Listener type objects.

Depending upon the implementation details, it may be desirable for each ActionPack object to have a unique name in the UI configuration file 169. An ActionPack object is executed by an Action object of the type "PackedActionCaller." In particular implementations, an ActionPack object may be limited to having a single Action object. In such embodiments, an ActionGroup object may be used to include multiple Action objects.

The following XML code provides a non-limiting example of an ActionPack object having an embedded Condition object and Data type object.

```
<ActionPacks>
    <ActionPack Name="SaveFirstState">
        <Action Type="MethodCallAction">
            <Condition Type="BooleanCondition"
                Operator="Equal">
                <Left Type="DataConstant">False</Left>
                <Right Type="DataSurface"
                    Name="WindowHistories.Contains">
                    <Parameter Type="DataWindow"
                        Name="Handle"></Parameter>
                </Right>
            </Condition>
            <Data Type="DataSurface"
                Name="WindowHistories.SaveState">
                <Parameter Type="DataConstant">First
                    State</Parameter>
                <Parameter Type="DataWindow"
                    Name="Handle"></Parameter>
            </Data>
        </Action>
```

-continued

```
    </ActionPack>
</ActionPacks>
```

The following XML code provides a non-limiting example of a Listener type object having an embedded Action object of type "PackedActionCaller" that calls an ActionPack object named "CaptureWindow."

```
<Listener Type="WindowMessage" Data="24" Enabled="True">
    <Condition Type="ConditionGroup" Combination="And">
        <Condition Type="BooleanCondition" Operator="Equal">
            <Left Type="DataVariable"
                Name="EnableWindowShowListener"></Left>
            <Right Type="DataConstant">True</Right>
        </Condition>
        <Condition Type="PackedConditionCaller"
            Name="IsTargetWindow"></Condition>
    </Condition>
    <Action Type="PackedActionCaller"
        Name="CaptureWindow">
    </Action>
</Listener>
```

6. Condition Packs

A ConditionPack object is a collection or set of Condition objects packaged together to form a single reusable set of conditions for validation by the Surface 322. The ConditionPack object may be called from different objects (e.g., Listener type objects, Action objects, ActionPack objects, ActionGroup objects, and the like).

Depending upon the implementation details, it may be desirable for each ConditionPack object to have a unique name in the UI configuration file 169. A ConditionPack object is executed by an Action object of the type "Packed-ConditionCaller." In particular implementations, a ConditionPack object may be limited to having a single Condition object. In such embodiments, a ConditionGroup object may be used to include multiple Condition objects.

The following XML code provides a non-limiting example of a ConditionPack object named "IsTargetWindow" having an embedded ConditionGroup object and Data type object.

```
<ConditionPacks>
    <ConditionPack Name="IsTargetWindow">
        <Condition Type="ConditionGroup" Combination="And">
            <Condition Type="IntPtrCondition"
                Operator="Equal">
                <Left Type="DataWindow"
                    Name="ParentHandle">
                </Left>
                <Right Type="DataConstant">0</Right>
            </Condition>
            <Condition Type="ConditionGroup"
                Combination="Or">
                <Condition Type="BooleanCondition"
                    Operator="Equal">
                    <Left Type="DataVariable"
                        Name="ValidateIsModalDialog">
                    </Left>
                    <Right Type="DataConstant">False
                    </Right>
                </Condition>
                <Condition Type="BooleanCondition"
                    Operator="Equal">
                    <Left Type="DataWindow"
                        Name="IsModalDialog">
                    </Left>
                    <Right Type="DataConstant">False
                    </Right>
                </Condition>
            </Condition>
            <Condition Type="ConditionGroup"
                Combination="Or">
                <Condition Type="BooleanCondition"
                    Operator="Equal">
                    <Left Type="DataVariable"
                        Name="ValidateIsToolWindow">
                    </Left>
                    <Right Type="DataConstant">False
                    </Right>
                </Condition>
                <Condition Type="BooleanCondition"
                    Operator="Equal">
                    <Left Type="DataWindow"
                        Name="IsToolWindow">
                    </Left>
                    <Right Type="DataConstant">False
                    </Right>
                </Condition>
            </Condition>
        </Condition>
    </ConditionPack>
    <ConditionPack Name="IsShowWindowMessage">
        <Condition Type="IntPtrCondition" Operator="NotEqual">
            <Left Type="DataContext"
                Name="HookedMessage.wParam">
            </Left>
            <Right Type="DataConstant">0</Right>
        </Condition>
    </ConditionPack>
</ConditionPacks>
```

The following XML code provides two non-limiting examples of Condition objects both of type "PackedConditionCaller." The first one calls a ConditionPack object named "IsShowWindowMessage." The second one calls a ConditionPack object named "IsTargetWindow."

```
<Condition Type="PackedConditionCaller" Name="IsShowWindowMessage">
</Condition>
<Condition Type="PackedConditionCaller" Name="IsTargetWindow">
</Condition>
```

Methods

Figure 6:
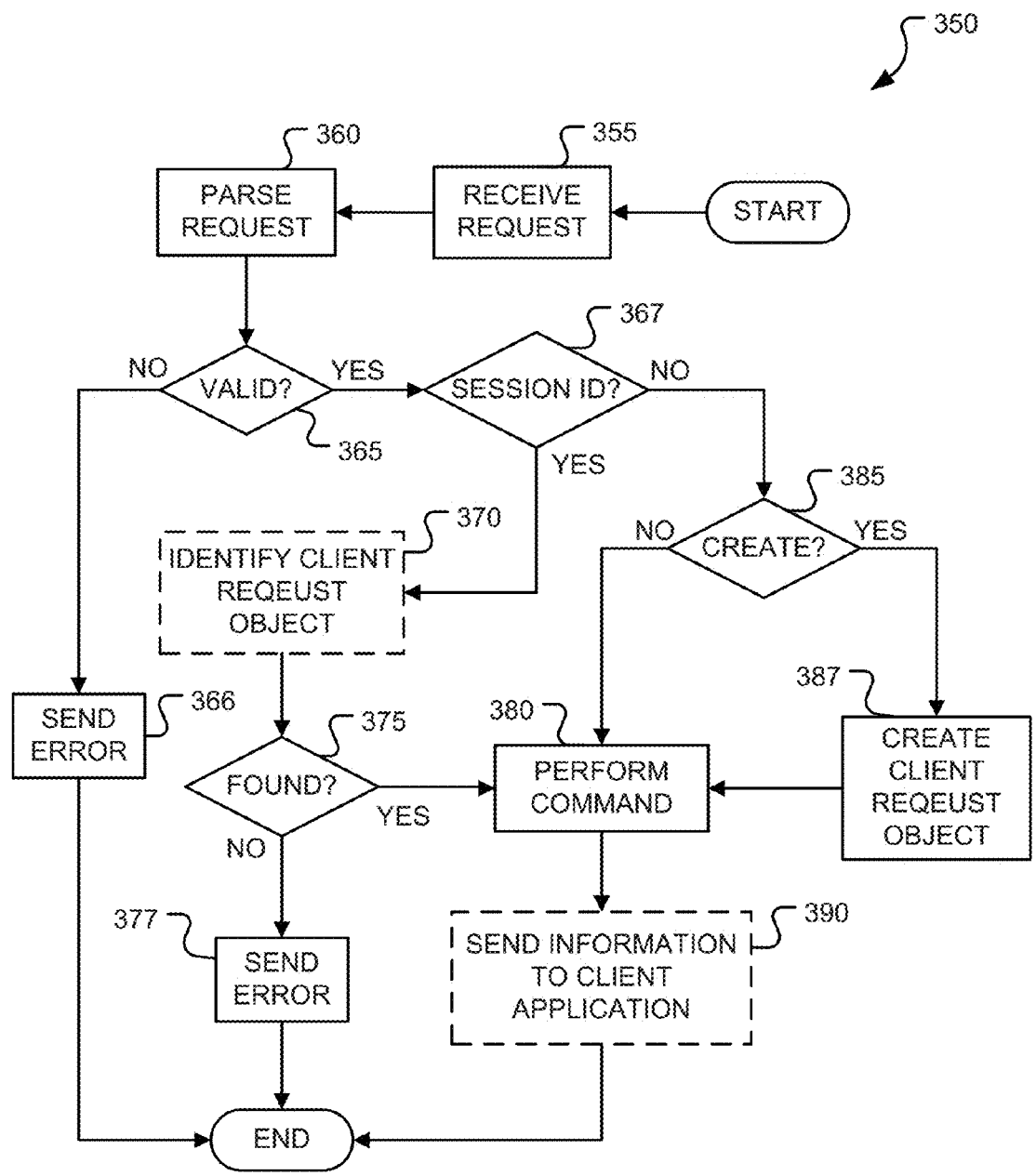
FIG. 6 is a flow diagram of a method performed by the Sandbox Manager of FIG. 2.

FIG. 6 provides a flow diagram of a method 350 performed by the Sandbox Manager 134 illustrated in FIGS. 2 and 5. In first block 355, the Sandbox Manager 134 receives a request from the Client Application 132. After the request is received, in block 360, the Sandbox Manager 134 parses the request to obtain the command and optionally, one or more parameters that may be included in the request. By way of a non-limiting example, in embodiments in which the request is a string, when a request from the Client Application 132 is received at the Sandbox Manager 134, the Sandbox Manager 134 parses the string to obtain the command and optional list of parameters.

Next, in decision block 365, the parameters are validated. By way of a non-limiting example, the parameters may be validated by determining whether the number of parameters matches the number that were expected. The decision in decision block 365 is "YES," when the parameter are valid (e.g., the number of parameters matches the number that were expected). Thus, if a particular command does not include parameters (e.g., the "ping" command), the decision in decision block 365 is "YES," if the request does not include any parameters. The decision in decision block 365 is "NO," when the parameter are invalid (e.g., the number of parameters does not match the number that were expected).

When the decision in decision block 365 is "NO," in block 366, an error message is sent to the Client Application 132. Then, the method 350 terminates.

When the decision in decision block 365 is "YES," the Sandbox Manager 134 advances to decision block 367. In decision block 367, the Sandbox Manager 134 determines whether the request includes a session identifier. The decision in decision block 367 is "YES" when the request includes a session identifier. The decision in decision block 367 is "NO" when the request does not include a session identifier.

When the decision in decision block 367 is "YES," in block 370, the session identifier is used to identify or locate a Client Request object associated with the session identifier and responsible for downloading and/or executing the virtualized application file identified by the session identifier. The dictionary 330 of the Client Request Manager 310 may be used to lookup the Client Request object associated with the session identifier.

In decision block 375, the Sandbox Manager 134 determines whether a Client Request object associated with the session identifier has been identified. The decision in decision block 375 is "YES," when a Client Request object associated with the session identifier has been identified. The decision in decision block 375 is "NO," when a Client Request object associated with the session identifier has not been identified in block 370.

When the decision in decision block 375 is "NO," in block 377, the Sandbox Manager 134 sends an error message to the Client Application 132. The error message may include the error indicator "Invalid Session Id" (see Table C above). Then, the method 350 terminates. Thus, if a command is sent to the Sandbox Manager 134 with a session identifier that is not in the dictionary 330, an error is returned to the Client Application 132 and a new request must be sent to the Sandbox Manager 134. For example, if a "status," "progress," or "exec" command was received in block 355 including a session identifier not associated with a Client Request object, for the Sandbox Manager 134 to perform the command, the transfer must be started again with a new request including the "start" command.

When the decision in decision block 375 is "YES," the Sandbox Manager 134 advances to block 380 described below.

When the decision in decision block 367 is "NO," the Sandbox Manager 134 advances to decision block 385 to determine whether the Sandbox Manager 134 should create a new Client Request object. Referring to Table A above, only two commands listed do not include the session identifier: the "start" command; and the "ping" command. The decision in decision block 385 is "YES" when the command in the request is the "start" command. Otherwise, the decision in decision block 385 is "NO." Thus, the decision in decision block 385 is "NO" when the request includes the "ping" command.

When the decision in decision block 385 is "YES," in block 387, the Sandbox Manager 134 creates a new Client Request object and associates the new Client Request object with a session identifier. By way of a non-limiting example, a method call may be made to the Client Request Manager 310 (see FIG. 5) to create the new Client Request object. In response to the method call, the Client Request Manager 310 identifies the Client Request object type that manages details about the particular virtualized application file being transferred to and/or executed on the client computing device 9 (see FIG. 1). Then, a new Client Request object having the type identified by the Client Request Manager 310 is created.

The Client Request Manager 310 includes a Client Request object for each virtualized application file the Sandbox Manager 134 is transferring and/or executing. The Client Request object may be cached in the dictionary 330 of the Client Request Manager 310, which may be configured to provide fast lookup of the Client Request object in response to subsequent requests including the session identifier involving the cached Client Request object. The Client Request object is responsible for managing the transfer of the virtualized application file, status of the transfer, progress of the transfer, execution of the virtualized application file, management of the cache 139 (see FIG. 2), etc. Thus, when a transfer is started, a unique session identifier is generated, a Client Request object is created, the Client Request object is associated with the unique session identifier, and the Client Request object is stored in the dictionary 330 for future lookups. The status field of the new Client Request object is set to "Not Started" and the progress field is set to "0%."

Then, the Sandbox Manager 134 advances to block 380 from block 387. When the decision in decision block 385 is "NO," the Sandbox Manager 134 also advances to block 380.

In block 380, Sandbox Manager 134 performs the command. If applicable, the command is executed on the Client Request object identified in block 370 or created in block 387. Then, in optional block 390, Sandbox Manager 134 sends information back to the Client Application 132. For example, as discussed below with respect to the method 400 (see FIG. 7), some commands instruct the Sandbox Manager 134 to perform operations that return values to the Client Application 132. Then, the method 350 terminates.

If the command is a "ping" command, in blocks 380 and 390, the Sandbox Manager 134 sends a response to the Client Application 132. If the command is a "start" command, in block 380, the Downloader 315 downloads the virtualized application file 140. If the command is a "status" command, in blocks 380 and 390, the Sandbox Manager 134 obtains the status value from the status field of the Client Request object identified in block 370 or created in block 387 and sends the status value to the Client Application 132. If the command is a "progress" command, in blocks 380 and 390, the Sandbox Manager 134 obtains the progress value from the progress field of the Client Request object identified in block 370 or created in block 387 and sends the progress value to the Client Application 132. If the command is a "exec" command, in block 380, the Executer 320 executes the virtualized application file 140.

Figure 7:
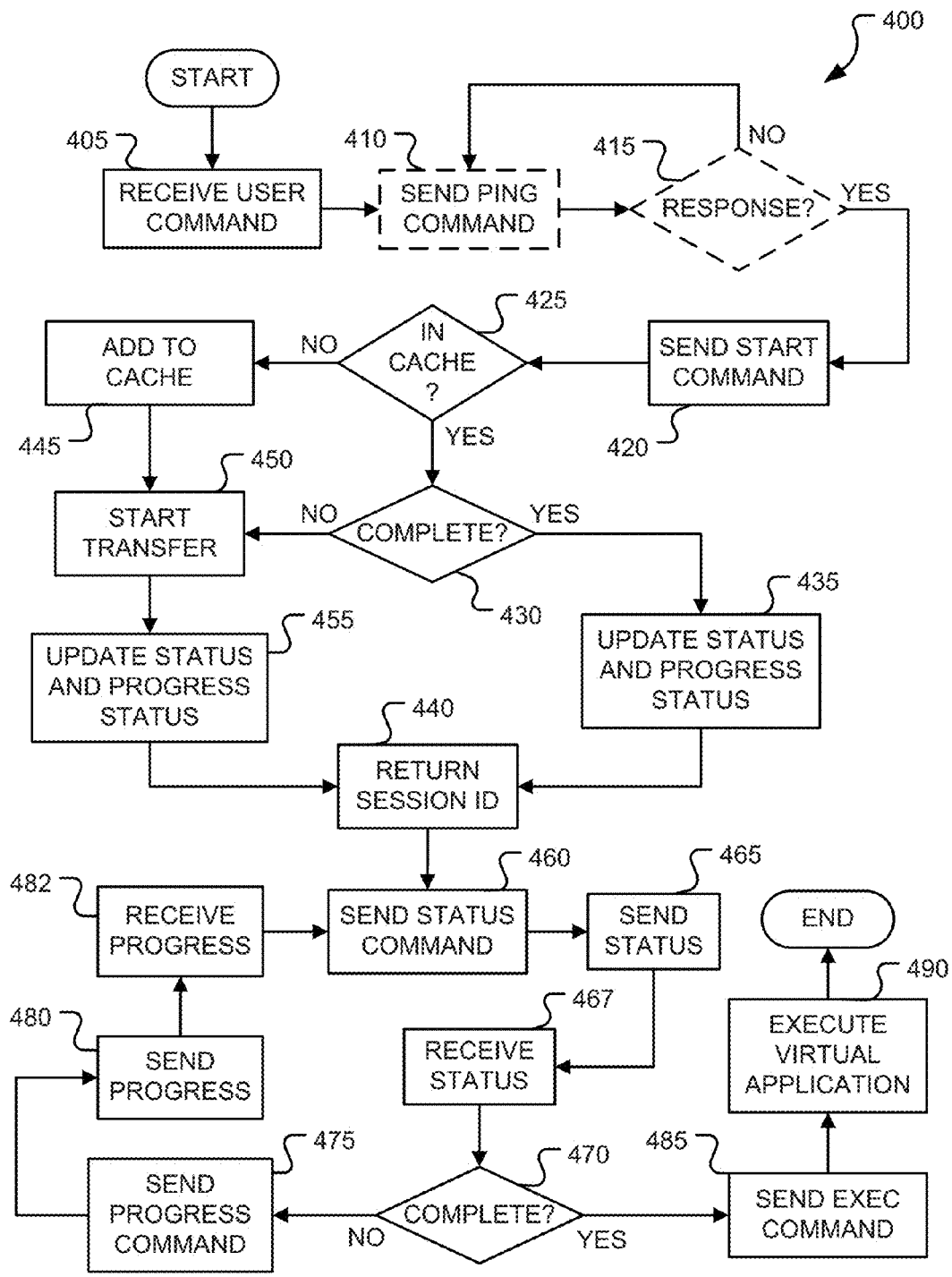
FIG. 7 is a flow diagram of a method of transferring the virtualized application file from the server computing device to the client computing device over a network and/or executing the virtualized application file on the client computing device.

FIG. 7 is a flow diagram illustrating the method 400, which provides a non-limiting example of a typical communication flow between the Client Application 132 and the Sandbox Manager 134. The method 400 transfers the virtualized application file 140 (if the virtualized application file 140 is not already stored in the cache 139 illustrated in FIG. 2) from the server computing device 7 (see FIG. 1) to the cache 139 illustrated in FIG. 2 of the client computing device 9 (see FIG. 1). The method 400 then executes the downloaded virtualized application file 140 stored in the cache 139 on the client computing device 9 (see FIG. 1). The method 400 is performable automatically by the Client Application 132 and the Sandbox Manager 134 after the user has entered a single user command into the Client Application 132. Thus, the method 400 may be characterized as implementing a one-click virtualized application file download manager and Executer.

In first block 405, the Client Application 132 receives a new user command to download and execute the virtualized application file 140. In block 410, the Client Application 132 sends a request including the "ping" command to the Sandbox Manager 134. The "ping" command is sent by the Client Application 132 to determine whether the Sandbox Manager 134 is in a state to service commands (e.g., available and functioning) and capable of responding to requests. If the Sandbox Manager 134 is running and in a state to service commands, the Sandbox Manager 134 will send a response to the Client Application 132.

In decision block 415, the Client Application 132 determines whether it has received a response from the Sandbox Manager 134 to the request sent in block 410. The decision in the decision block 415 is "YES" when the Client Application 132 has received a response from the Sandbox Manager 134 indicating that the Sandbox Manager 134 is in a state to service commands and is capable of responding to requests. The decision in the decision block 415 is "NO" when the Client Application 132 has not received a response from the Sandbox Manager 134 or receives a response indicating the Sandbox Manager 134 is not in a state to service commands (e.g., available and functioning) or is incapable of responding to requests.

When the decision in the decision block 415 is "NO," the Client Application 132 returns to block 410. Alternatively, when the decision in the decision block 415 is "NO," the method 400 may terminate. Optionally, the Client Application 132 may display a message to the user indicating the virtualized application file 140 is not available to download.

When the decision in the decision block 415 is "YES," in block 420, the Client Application 132 establishes a new communication session with the Sandbox Manager 134 and sends a request including a "start" command to the Sandbox Manager 134. As mentioned above, when the communications server 300 (see FIG. 5) of the Sandbox Manager 134 initiates a new session, the communications server 300 generates a new and unique session identifier. The "start" command commands the Sandbox Manager 134 to begin transferring the virtualized application file 140.

In block 425, when the Sandbox Manager 134 receives the "start" command, the Client Request Manager 310 identifies a Client Request object type for the virtualized application file 140, creates a Client Request object of the type identified, and associates the session identifier with the new Client Request object. Then, the Sandbox Manager 134 determines whether at least a portion of the virtualized application file 140 is stored in the cache 139 (see FIG. 2) of the filesystem 126A (see FIG. 2). The decision in the decision block 425 is "YES" when at least a portion of the virtualized application file 140 is stored in the cache 139 (see FIG. 2). Otherwise, the decision in the decision block 425 is "NO."

When the decision in decision block 425 is "YES," in decision block 430, the Sandbox Manager 134 determines whether the virtualized application file 140 is stored in its entirety in the cache 139 (see FIG. 2) of the filesystem 126A (see FIG. 2). The decision in the decision block 430 is "YES" when the virtualized application file 140 is stored in its entirety in the cache 139 (see FIG. 2) of the filesystem 126A (see FIG. 2). The decision in the decision block 430 is "NO" when less than the entire virtualized application file 140 is stored in the cache 139 (see FIG. 2).

When the decision in decision block 430 is "YES," the virtualized application file 140 need not be transferred to the client computing device 9 because the virtualized application file is already stored in the cache 139 (see FIG. 2) of the filesystem 126A (see FIG. 2). In block 435, the Sandbox Manager 134 updates the status field of the Client Request object to "Complete" and the progress field to "100%." Then, the Sandbox Manager 134 advances to block 440.

When the decision in decision block 425 or decision block 430 is "NO," the Sandbox Manager 134 begins transferring the virtualized application file. If the decision block 425 was "NO," in block 445, the Sandbox Manager 134 adds the virtualized application file 140 to the cache 139 (see FIG. 2) of the filesystem 126A (see FIG. 2). The Sandbox Manager 134 sets the status field of the Client Request object to "Not Started" and the progress field to "0%." Then, in block 450, the Sandbox Manager 134 begins transferring the virtualized application file 140 from its beginning.

If the decision block 425 was "YES" but the decision block 430 was "NO," in block 450, the Sandbox Manager 134 sets the status field of the Client Request object to "In Progress," calculates the progress value, and sets the progress field to the calculated progress value. Then, the Sandbox Manager 134 begins transferring the virtualized application file from wherever the previous transfer activities left off. The transfer may be started in a new thread using http protocol. In block 455, the progress field of the Client Request object is updated occasionally (e.g., periodically) to indicate the percentage of the virtualized application file 140 transferred. Then, the Sandbox Manager 134 advances to block 440.

In block 440, the Sandbox Manager 134 returns the session identifier associated with the virtualized application file 140 to the Client Application 132.

In block 460, the Client Application 132 sends a request to the Sandbox Manager 134 including the "status" command. In response to the "status" command, in block 465, the Sandbox Manager 134 sends the status value (e.g., "in progress" or "complete") of the status field of the Client Request object to the Client Application 132. In block 467, the Client Application 132 receives the status value sent by the Sandbox Manager 134. Optionally, the Client Application 132 may display the status value of the transfer to the user.

In decision block 470, the Client Application 132 determines whether the entire virtualized application file has been downloaded. The decision in decision block 470 is "YES," if the status field of the Client Request object indicates the entire virtualized application file has been downloaded (e.g., the status field has the value "Complete"). The decision in decision block 470 is "NO," if the status field of the Client Request object indicates the virtualized application file 140 has not been completely downloaded (e.g., status field has the value "In Progress").

If the decision in decision block 470 is "NO," in block 475, the Client Application 132 sends a request to the Sandbox Manager 134 including the "progress" command to determine the progress value of the transfer of the virtualized application file 140. In response to the "progress" command, in block 480, the Sandbox Manager 134 sends the progress value in the progress field of the Client Request object (e.g., "10%," "25%," etc.) to the Client Application 132. In block 482, the Client Application 132 receives the progress value sent by the Sandbox Manager 134. Optionally, the Client Application 132 may display the progress value to the user. Then, the Client Application 132 returns to block 460.

If the decision in decision block 470 is "YES," in block 485, the Client Application 132 sends a request to the Sandbox Manager 134 including an "exec" command. In response to the "exec" command, in block 490, the Executer 320 (see FIG. 5) of the Sandbox Manager 134 executes the virtual application 110 at least partially implemented by the virtualized application file 140 that the Sandbox Manager 134 has just transferred. Then, the method 400 terminates.

As mentioned above, the parameters of the "exec" command includes the session identifier (identifying the virtualized application file transferred) and optional command-line arguments. The session identifier is used to identify the Client Request Object storing the path to the transferred virtualized application file stored on the cache 139 (see FIG. 2) of the filesystem 126A (see FIG. 2). The path is then used to execute the transferred virtualized application file. The transferred virtualized application file may be executed via an operating system programming interface function call (e.g., ShellExecute, CreateProcess, and the like).

In block 490, if the virtualized application file 140 is configured to be executed inside a virtualized environment provided a virtual machine executable file (e.g., the virtualized application file 140 is not an executable file having the ".exe" extension), the Sandbox Manager 134 executes the virtual machine executable file and instructs the executing virtual machine to execute the virtualized application file 140. The Sandbox Manager 134 may send a command to the operating system 35A to execute the virtual machine inside an operating system shell process. The command may include the path to the virtualized application file 140 as a parameter that the virtual machine uses to locate and execute the virtualized application file 140.

If more than one virtual machine executable file (e.g., virtual machine executable files 137) are stored in the system memory 22A, the Sandbox Manager 134 identifies which of the virtual machine executable files 137 is configured to execute the virtualized application file 140. As explained above, the virtualized application file 140 may include a version identifier that may be used by the Sandbox Manager 134 to select which of the virtual machine executable files 137 is configured to execute the virtualized application file 140. Each of the virtual machine executable files 137 may also include a version identifier that may be matched to the version identifier of a particular virtualized application file to determine whether the virtual machine executable file is configured to execute the particular virtualized application file.

By way of a non-limiting example, blocks 425, 430, 435, 445, 450, and 455 of the method 400 may be implemented in accordance with the following block of pseudo code.

```
// check filesystem cache
long lTransferStartPoint = 0 ;
string sPath = BuildCacheLocation(uriAppSource) ;
if(File.Exists(sPath))
{
  long lFullSize = FindFullSize(uriAppSource) ;
  long lSizeOnDisk = File.GetSize(sPath) ;
```

-continued

```
  if(lSizeOnDisk == lFullSize) {
    // the app is already fully cached,
    // no transfer needed
    SetTransferComplete( ) ;
    return;
  }
  lTransferStartPoint = lSizeOnDisk;
}
// start the transfer
StartDownload(uriAppSource, lTransferStartPoint) ;
```

By way of a non-limiting example, the function named "StartDownload" used in the above block of pseudo code may be implemented as follows:

```
// a function to transfer the application
function void StartDownload(Uri uriSource, long lStartPoint)
{
  HttpWebRequest oReq = HttpWebRequest.Create(uriSource) ;
  oReq.AddRange(lStartPoint) ;
  HttpWebResponse oRes = oReq.GetResponse( ) ;
  Stream oStream = oRes.GetResponseStream( ) ;
  while(true) {
    int iBytes = oStream.Read(aBuffer) ;
    if(iBytes == 0) return;
    WriteBufferToCacheLocation(aBuffer) ;
    UpdateCurrentProgress ( ) ;
  }
}
```

By way of a non-limiting example, the function named "FindFullSize" used in the first block of pseudo code may be implemented as follows:

```
// a function to return the full size of the
// application to be transferred.
function long FindFullSize(Uri uriAppSource)
{
  string sResponse = DoHttpHeadRequest(uriAppSource) ;
  long lContentLength = ParseContentLength(sResponse) ;
  return lContentLength;
}
```

Configure Surface

Figure 11:
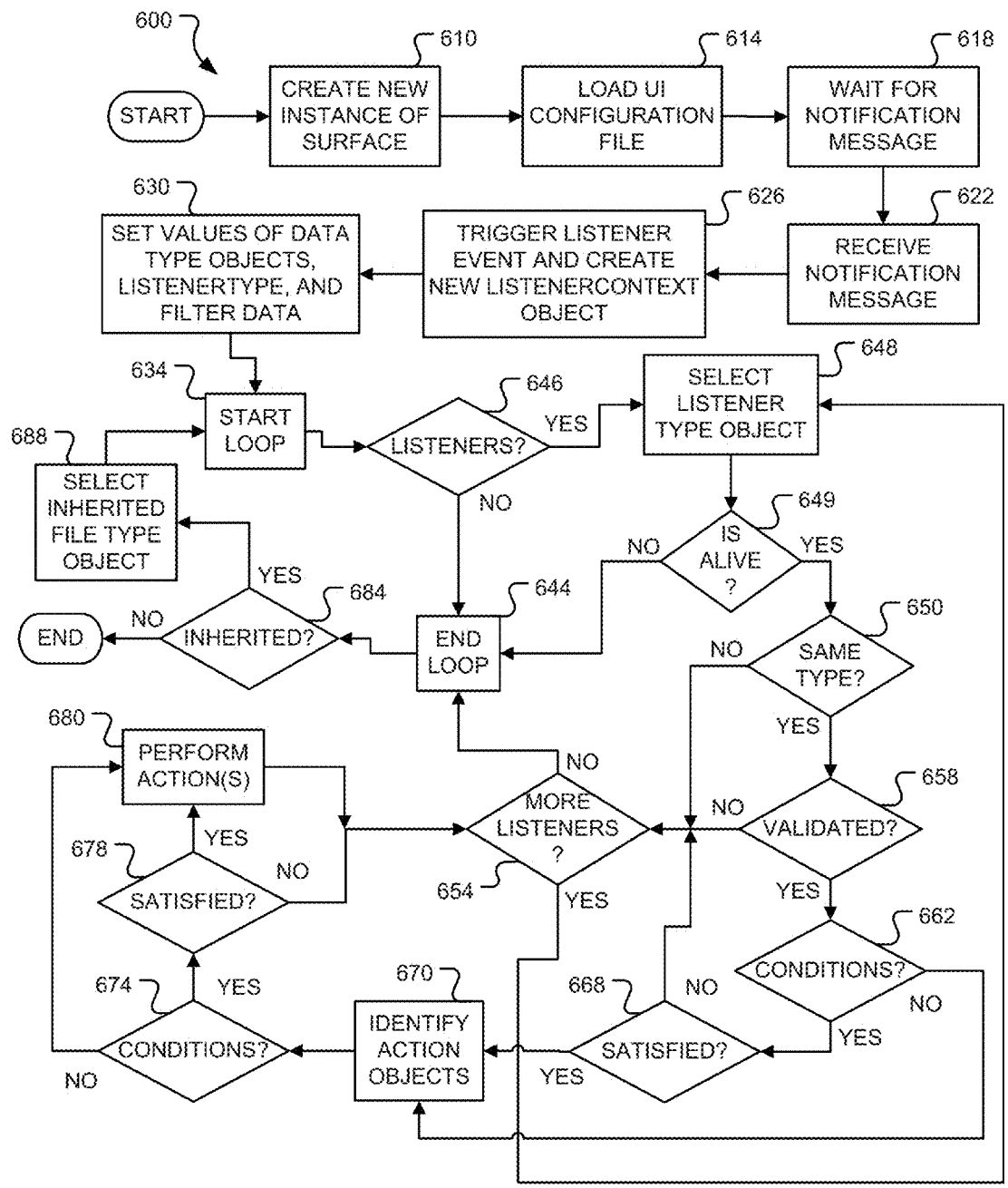
FIG. 11 is a flow diagram of a method performed at least in part by the Surface.

Referring to FIG. 11, the method 600 is performed as the Executer 320 initiates execution of the virtual application 110 in block 380 of the method 350 illustrated in FIG. 6 or block 490 of the method 400 illustrated in FIG. 7. When the virtual application 110 is executed by the Executer 320 and its user interface displayed by the Client Application 132, the virtual application 110 may be characterized as being "hosted" inside the Surface 322.

To host the virtual application 110 inside the Surface, in block 610, a new instance of the Surface class is created. Then, in block 614, the UI configuration file 169 for the virtual application 110 is loaded by the Surface 322. When the instance is being created, the handle of the hosting panel or control 129 is forwarded to the Surface.

The following pseudo code provides an example of how the new instance of the Surface class may be created and how the handle of the control 129 may be provided to the new instance of the Surface class. As is apparent to those of ordinary skill in the art, the handle of the control 129 may have been passed to the Sandbox Manager 134 by the plug-in 136. The Sandbox Manager 134 may then provide the handle of the control 129 to the Surface 322.

```
Handle hWndHostingPanel = GetPanelHandle( ) ;
Surface surface = new Surface(hWndHostingPanel) ;
// create the Start info for the target process
ProcessStartInfo pInfo = BuildProcessInfo( ) ;
surface.Start (pInfo) ;
// Load the configuration file
string configPath = FindConfigFilePath( ) ;
surface.Configuration.Load(configPath) ;
```

After the UI configuration file 169 is loaded, in block 618, the Surface 322 waits for notification messages from the virtual runtime engine. In block 622, the Surface 322 receives a notification message from the virtual runtime engine. After receiving the message, in block 626, the Surface triggers a new Listener event and creates a new ListenerContext object. As mentioned above, ListenerContext objects have a ListenerType value, FilterData, and an IsAlive property. The ListenerContext object may also include one or more Data type objects.

In block 630, the Surface 322 sets the values of Data type objects in the ListenerContext object, sets the ListenerType value, and sets the FilterData values based at least in part on the event that invoked the notification message received in block 622.

Starting in block 634, the Surface 322 loops through the Listeners. In other words, the Surface 322 analyzes each of the Listener type objects in the UI configuration file (or Listener objects defined thereby) to determine which, if any, are associated with the event that invoked the notification message. By way of a non-limiting example, in block 634, the Surface 322 may set the execution stack to the current UI configuration file (e.g., the UI configuration file 169). In other words, the Surface 322 may loop through Listeners in the stack frame. In the method 600, the Surface 322 may examine each of the Listener type objects in the order they are defined in the UI configuration file 169.

In decision block 646, the Surface 322 determines whether the UI configuration file includes one or more Listener type objects.

If the UI configuration file does not include one or more Listener type objects, the decision in decision block 646 is "NO," and the Surface 322 advances to block 644.

If the UI configuration file includes one or more Listener type objects, the decision in decision block 646 is "YES," and in block 648, the Surface 322 selects a Listener type object to evaluate.

Then, in decision block 649, the Surface 322 determines whether the IsAlive property of the ListenerContext indicates it is alive. If the IsAlive property of the ListenerContext indicates it is not alive, the decision in decision block 649 is "NO," and in block 644, the Surface 322 terminates the loop.

If the IsAlive property of the ListenerContext indicates it is alive, the decision in decision block 649 is "YES." When the decision in decision block 642 is "YES," in decision block 650, the Surface 322 validates that the Type of the Listener selected in block 648 is same as the ListenerType value of the ListenerContext object. If the type is not the same, the decision in decision block 650 is "NO," and in decision block 654, the Surface 322 determines whether there is a next Listener. If there is a next Listener, the decision in decision block 654 is "YES," and the Surface returns to in block 648 and selects another Listener. If there are no more Listeners, the decision in decision block 654 is "NO," and the Surface 322 advances to block 644 to terminate the loop.

If the Type of the Listener is the same as the ListenerType value of the ListenerContext object, the decision in decision block 650 is "YES." When the decision in decision block 650 is "YES," the Surface 322 advances to decision block 658 whereat the Surface 322 determines whether the Listener is validated in view of the ListenerContext object. In decision block 658, the Surface 322 compares the Data of the Listener with the data of the FilterData of the ListenerContext object to determine whether the Listener should be processed further. In other words, in decision block 658, the Surface 322 determines whether the notification message received by the Surface 322 applies to the Listener.

If the validation fails, the decision in decision block 654 is "NO," and the Surface 322 returns to block 654.

On the other hand, if the validation is successful, the decision in decision block 658 is "YES," and in decision block 662, the Surface 322 determines whether the Listener type object is associated with one or more conditions. If the Listener type object is associated with one or more Condition objects, the decision in decision block 662 is "YES," and in decision block 668, the Surface 322 determines whether the conditions specified by the Condition object(s) is/are satisfied.

If the conditions are not satisfied, the decision in decision block 668 is "NO," the Surface 322 returns to decision block 654 to determine whether there is a next Listener.

If the conditions are satisfied, the decision in decision block 668 is "YES," in block 670, the Surface 322 identifies any Action objects associated with the Listener.

If the Listener type object is not associated with one or more Condition objects, the decision in decision block 662 is "NO," and the Surface 322 advances to block 670.

In decision block 674, for each Action objects associated with the Listener, the Surface 322 determines whether the Action object is associated with one or more conditions. If the Action object is associated with one or more Condition objects, the decision in decision block 674 is "YES," and in decision block 678, the Surface 322 determines whether the conditions specified by the Condition object(s) is/are satisfied.

If the conditions are satisfied, the decision in decision block 678 is "YES," and in block 680, the Surface 322 performs the action(s) specified by the Action object. Then, the Surface 322 returns to decision block 654 to determine whether there is at least one more Listener to evaluate.

If the Action object is not associated with one or more Condition objects, the decision in decision block 674 is "NO," and in block 680, the Surface 322 performs the action(s) specified by the Action object.

If the conditions are not satisfied, the decision in decision block 678 is "NO," and the Surface 322 returns to decision block 654 to determine whether there is at least one more Listener to evaluate.

After the loop through the Listeners is ended in block 644, in decision block 684, the Surface 322 determines whether the UI configuration file 169 includes one or more inherited file type objects (i.e., links to inherited UI configuration files) that have not been processed.

If the UI configuration file 169 includes one or more inherited file type objects that have not been processed, the decision in decision block 684 is "YES," and in block 688, the Surface 322 selects an inherited file type object that has not been processed. Then, in block 688, the Surface 322 increases the stack level. Then, the Surface 322 returns to block 634 to start to loop through the Listener type objects of the inherited UI configuration file.

If the UI configuration file 169 does not include one or more inherited file type objects that have not been processed, the decision in decision block 684 is "NO," and the method 600 terminates.

Execute Virtual Application

After the new instance of the Surface class is created in block 610 of the method 600, the Surface class initiates execution of the user interface of the virtual application 110 inside the Surface 322. However, the virtual runtime engine actually executes the virtual application 110.

By way of a non-limiting example, the Surface class may include a Start method that when executed initiates execution of a target process (e.g., the virtual application 110). The following pseudo code, is a non-limiting example of an implementation of the Start method of the Surface class.

```
// This function starts the target application
// inside the Surface
function void Start(ProcessStartInfo info)
{
    ProcessCreator creator = new ProcessCreate(info) ;
    creator.Suspend = true;
    RunListener(creator, ListenerType.BeforeStart, null) ;
    If (creator.Start ( ))
    {
        creator. Resume( ) ;
        RunListener(creator, ListenerType.AfterStart, null) ;
    }
}
```

In the pseudo code above, a Start method of a ProcessCreator class object (named "creator") is responsible for starting the virtual application 110. By way of a non-limiting example, the following pseudo code may be used to implement the Start method of the ProcessCreator class.

```
// This function starts the target application
function bool Start( )
{
    if (_StartInfo.UseShellExecute)
    {
        // if ShellExecute use direct process start
        Process p = Process.Start (_StartInfo) ;
        if (p != null)
        {
            _Information.hProcess = p.Handle;
            _Information.ProcessId = p.Id;
            return true;
        }
    }
    else
    {
        // Create process with the Suspend mode
        STARTUPINFO info = new STARTUPINFO ( ) ;
        info.cb = Marshal.SizeOf (info) ;
        if (CreateProcess (
            StartInfo.FileName,
            StartInfo.Arguments,
            0, 0, false,
            Suspend ? CreationFlags.CREATE_SUSPENDED :
(CreationFlags) 0,
            IntPtr.Zero,
            Path.GetDirectoryName (_StartInfo.FileName) ,
            ref info,
            ref _Information))
        {
            return true;
        }
    }
}
```

In the pseudo code above, if the virtual application 110 is not to be executed in an operating system shell, the virtual application 110 is started in a suspended state so that the Surface 322 can be completely initialized before any windowing messages are sent by the virtual application 110. For example, execution of the virtual application 110 may be suspended until the UI configuration file 169 has been loaded in block 614 of the method 600. On the other hand, if the virtual application 110 is to be executed in a shell, execution is initiated directly in an unsuspended state. By way of a non-limiting example, the Surface 322 may determine the virtual application 110 is to be executed in a shell when the UseShellExecute flag of the ProcessStartInfo object is set to TRUE. In that case, the virtual application 110 will start directly without being suspended initially.

Figure 12:
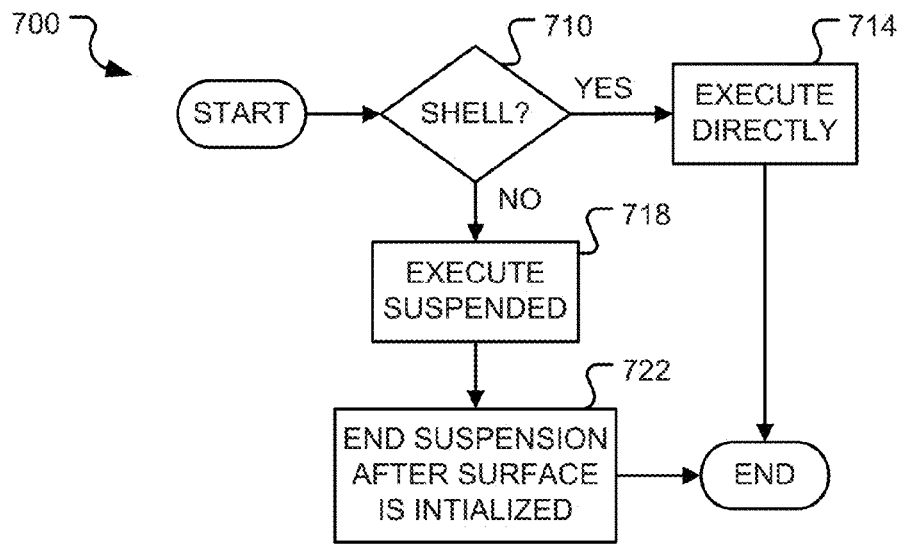
FIG. 12 is a flow diagram of a method performed at least in part by the Surface.

Thus, referring to FIG. 12, the Surface 322 may perform a method 700 when initiating execution of the virtual application 110 inside the Surface 322. In decision block 710, the Surface 322 determines whether the virtual application is to be executed in a shell. If the virtual application is to be executed in a shell, the decision in decision block 710 is "YES," and in block 714, the Surface 322 executes the virtual application directly. Optionally, the user interface of the virtual application 110 may be displayed inside the control 129.

If the virtual application is not to be executed in a shell, the decision in decision block 710 is "NO," in block 718, the Surface 322 executes the virtual application 110 in a suspended state until the Surface 322 has finished its initialization process. Then, in block 722, the suspension is ended and the virtual application 110 is executed in an unsuspended state. Then, the method 700 terminates.

As mentioned above, the virtual application 110 is actually executed (at least in part) by the virtual runtime engine. Further, the virtual runtime engine monitors the windowing messages generated by the virtual application 110 and forwards at least some of them to the Surface 322 for processing. By way of a non-limiting example, one or more hooks may be used to perform the monitoring.

As is appreciated by those of ordinary skill in the art, a hook may be used to monitor an operating system for certain events (e.g., to monitor a message-handling mechanism). For example, Microsoft Windows Operating System provides WH_CALLWNDPROC and WH_CALLWNDPROCRET hook types that may be used to monitor messages sent to window procedures (e.g., calls to the SDK exposed functions). The WH_CALLWNDPROC hook type monitors messages sent to window procedures. The WH_CALLWNDPROCRET hook type monitors the window procedures and determines when the procedures have finished processing messages. The events monitored by a hook may be associated with a particular thread or with all of the threads in the same desktop as the calling thread.

Custom procedures (referred to as "hook procedures") may be specified for a particular hook type. For example, a hook procedure may be specified for the WH_CALLWNDPROC hook type by calling a SetWindowsHookEx method and identifying the WH_CALLWNDPROC hook type as a parameter. The thread to be monitored may also be specified as a parameter.

When an event occurs that is monitored by the particular hook, the hook calls hook procedures specified for the particular hook type. The Windows Operating System allows the hook procedures specified for the WH_CALLWNDPROC hook to be called before the windowing messages are sent to receiving window procedures.

The virtual runtime engine may set up a hook procedure for each of the threads used by the target application at the moment. The virtual runtime engine may also set up a hook procedure for threads created later by calling SetWindowsHookEx method with the WH_CALLWNDPROC parameter.

Figure 13:
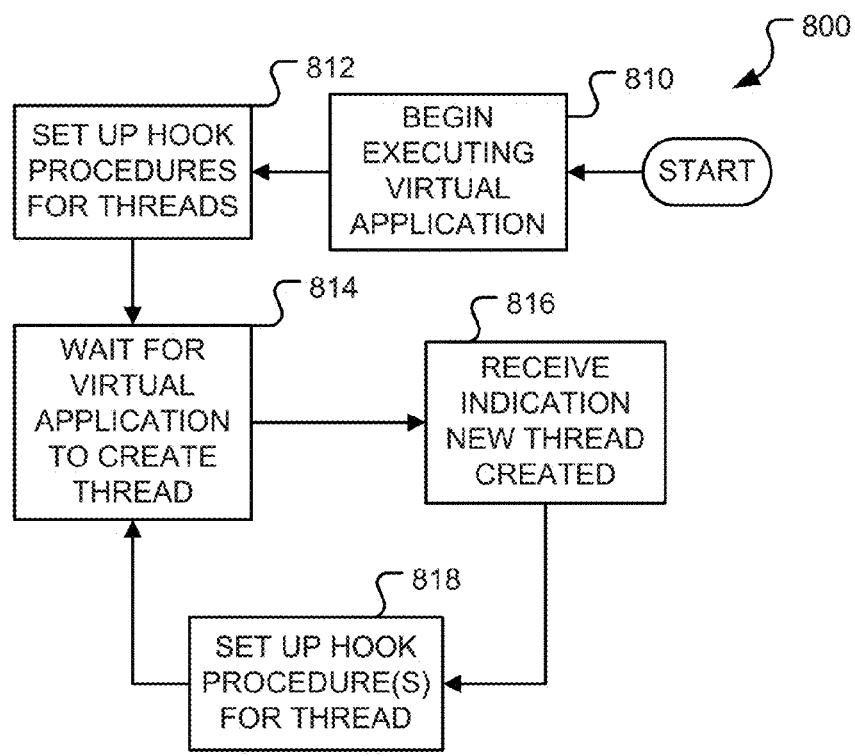
FIG. 13 is a flow diagram of a method of setting up hook procedures for threads initiated by the virtual application performed at least in part by the virtual runtime engine executing the virtual application.

Referring to FIG. 13, a method 800 may be performed by the virtual runtime engine. The method 800 sets up a hook procedure for the thread(s) created by the virtual application 110 as it executes.

In first block 810, the virtual runtime engine begins executing the virtual application 110. When the virtual application 110 is started, in block 812, the virtual runtime engine sets up one or more hook procedures to monitor one or more threads used by the virtual application 110. The virtual runtime engine sets a hook procedure for each thread initiated by the virtual application 110. By way of a non-limiting example, this may be accomplished by establishing one or more hook procedures on a hook configured to detect the creation of a new thread. For example, a hook configured to detect a call to the CreateRemoteThread function may be used. In such an embodiment, whenever the virtual application 110 creates a new thread, the virtual application 110 calls the CreateRemoteThread function.

The CreateRemoteThread function has two main parameters: (1) a pointer to a thread start routine; and (2) a pointer to application defined context data (i.e., a "context" pointer). The virtual runtime engine populates a data structure configured to store the values of these two parameters. The following code is an example of a data structure named "SThreadStartInfo" configured to store the parameters of the CreateRemoteThread function.

```
typedef struct _SThreadStartInfo
{
    LPTHREAD_START_ROUTINE RealStartRoutine;
    LPVOID RealParams;
} SThreadStartInfo;
```

After the data structure is populated, the virtual runtime engine calls the real-implementation of the CreateRemoteThread function in the host operating system passing (1) a pointer to a substitute thread-start function and (2) a pointer to the data structure instead of the application provided parameter values (i.e., pointer values).

The substitute thread-start routine extracts the SThreadStartInfo data structure from the "context" pointer (which as described above has been overridden). Then, per-thread initialization actions are performed that include setting up one or more SetWindowsHookEx callback functions. Lastly, control is passed to the application-defined thread start function along with the application-defined thread context data pointer. Both of which were cached in the SThreadStartInfo structure.

In block 812, the hook procedures triggered by the hook monitoring the creation of new threads set up the one or more hook procedures that will be executed when the virtual application 110 calls a windowing function within the thread. Thus, the method 800 establishes one or more hook procedures that are executed when a windowing message is generated (or a function call is sent to a windowing function).

Then, in block 814, the virtual runtime engine waits for the virtual application 110 to create a new thread (e.g., by calling the CreateRemoteThread function). While the virtual runtime engine waits, the user may be interacting with the virtual application 110 causing new threads to be created.

In block 816, the virtual runtime engine receives an indication that a new thread has been created. The indication may be provided by the virtual operating system 120 after it detects that a call has been made to the CreateRemoteThread function. Then, in block 818, the virtual runtime engine sets up one or more new hook procedures for the new thread. In block 818, the virtual runtime engine may set up the new hook procedures for the new thread in substantially the same manner the virtual runtime engine set up the hook procedures in the block 812 described above. Then, the virtual runtime engine returns to block 814.

By way of a non-limiting example, in blocks 812 and 818, the virtual runtime engine may specify one or more hook procedures for the WH_CALLWNDPROC hook that listen for windowing messages generated by a particular thread. The hook procedure or function is executed whenever a windowing message is generated that will be passed to a window procedure of the operating system (e.g., the virtual operating system 120). The following pseudo code is a non-limiting example of an implementation of a hook procedure or function configured to listen for windowing messages.

```
// Function for the Message Hook
function LRESULT MessageHookProcedure
(int nCode, WPARAM wParam,
LPARAM lParam)
{
    CWPSTRUCT * pInfo = (CWPSTRUCT*)lParam;
    // If is not in SurfaceCallback mode and message
    // is interested by the Surface
    if (!_InSurfaceCallback( ) &&
        _IsAcceptableMessage(pInfo->message))
    {
        // Sets the flag for the SurfaceCallback mode
        _EnterSurfaceCallback( ) ;
        // Send message to the Surface by using communication
object
        _SendWindowMessageMessage(pInfo->hwnd, pInfo->message,
            pInfo->wParam, pInfo->lParam) ;
        // Exit Surface Callback mode
        _ExitSurfaceCallback( ) ;
    }
// call next hook
return CallNextHookEx(0, nCode, wParam, lParam) ;
}
// Send windows message info to the WPM
Function HRESULT
_SendWindowMessageMessage(HWND hwnd, DWORD wmsg,
WPARAM wParam,
LPARAM lParam)
{
    CSafeHandle hPipeConnection;
    // We use another connection for synchronouse surface
notfications
    _ConnectNamedPipe(hPipeConnection, FALSE) ;
    CSurfaceMessages messages(hPipeConnection.Detach( )) ;
    _OnSurfaceMessage(hwnd, wmsg, wParam, lParam) ;
}
BOOL _fOk;
// Main entry point for a window message in "surface" mode
function HRESULT _OnSurfaceMessage(HWND hwnd,
DWORD wmsg, WPARAM
wParam, LPARAM lParam)
{
    SWindowMessageMessage msg;
    msg.HWnd = hwnd;
    msg.Msg = wmsg;
    msg.WParam = wParam;
    nsg.LParam = lParam;
    // Transact message from the named pipe communication
    _TransactMessage((PVOID)&msg, sizeof(msg)) ;
    while( _fOk)
```

-continued

```
{
    CComObjectStackEx<CBinaryReader> reader =
_InitializeReader( ) ;
    ULONG idMsg;
    reader.ReadULONG(idMsg) ;
    switch(idMsg)
    {
        case eNoMoreResponse:
            _fOk = FALSE;
            break;
        case eSetParent:
            _OnSetParent(reader, msg) ;
            break;
        case eEnableWindow:
            _EnableWindow(reader, msg);
            break;
        // All other Response Types exists in this method
    }
  }
}
// Function which is called when SetParent api call from the
Surface
function HRESULT
_OnSetParent(CBinaryReader & reader,
SActionResponseMessage &msg)
{
    HWND hwnd;
    HWND hwndParent;
    reader.ReadHWND(hwnd) ;
    reader.ReadHWND(hwndParent) ;
    msg.ReturnValue = SetParent(hwnd, hwndParent) ;
    msg.GetLastError = GetLastError( ) ;
}
```

Figure 14:
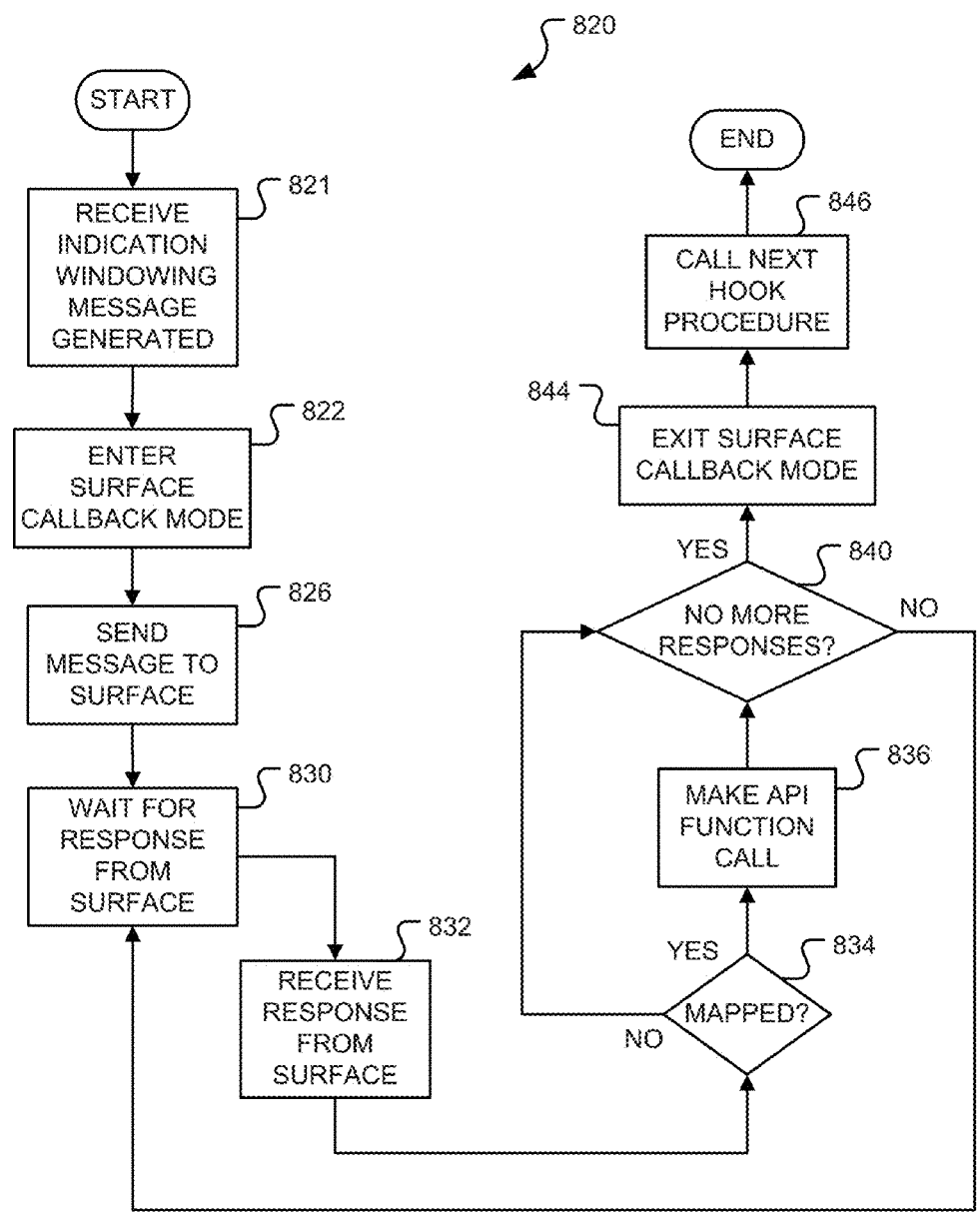
FIG. 14 is a flow diagram of a method performed at least in part by the virtual runtime engine when one of the hook procedures is executed.

FIG. 14 is a method 820 that may be performed by the virtual runtime engine. In first block 821, the virtual runtime engine receives an indication that the virtual application 110 has generated a windowing message. For example, in block 821, one of the hook procedures established in block 812 or 818 of FIG. 13 may have been executed. Thus, the method 820 may be executed for each hook procedure associated with the windowing message.

Then, in block 822, the virtual runtime engine enters a Surface Callback Mode. In block 826, the virtual runtime engine sends the message to the Surface 322. Then, in block 830, the virtual runtime engine waits for a response from the Surface 322.

A response is received in block 832. In decision block 834, the virtual runtime engine determines whether the response has been mapped to an operating system API function call (e.g., a WindowsAPI function call, a SDK exposed function, and the like).

If the response has been mapped, the decision in decision block 834 is "YES," and in block 836, the API function call is made. Then, the virtual runtime engine advances to decision block 840.

If the response has not been mapped, the decision in decision block 834 is "NO," and the virtual runtime engine advances to decision block 840.

In decision block 840, the virtual runtime engine determines whether any more responses will be sent. For example, when the Surface sends a response having the type "eNoMoreResponse," the virtual runtime engine determines no more responses will be sent. In such cases, the decision in decision block 840 is "YES." Otherwise, the decision in decision block 840 is "NO."

When the decision in decision block 840 is "NO," the virtual runtime engine returns to block 830.

When the decision in decision block 840 is "YES," in block 844, the virtual runtime engine exists Surface Callback Mode. Then, in block 846, the virtual runtime engine executes the next hook procedure, if any. For example, in block 846, the virtual runtime engine may call the CallNextHookEx function. Thus, the method 820 may be repeated for each hook procedure associated with a particular windowing message. Then, the method 820 terminates.

As discussed above, to improve performance, the virtual runtime engine may receive a list of the windowing messages in which the Surface 322 is interested during initialization of the Surface session. The list of the messages (in which the Surface 322 indicates that it is interested) may be generated by the Surface 322 by searching its UI configuration file(s) for Listener type objects of the WindowMessage type. Thus, before entering Surface CallBack Mode in block 822, the virtual runtime engine may decide whether to send the windowing message to the Surface 322.

As discussed above, hook procedures are established for one or more hooks. The hook procedures may be associated with one or more specific threads created by the virtual application 110 as it executes. Thus, a hook procedure is executed by a hook when a particular event occurs within a particular thread. Further, the virtual runtime engine may be in Surface Callback Mode with respect to a particular thread but not with respect to other threads.

When a hook identifies an event (of the type monitored by the hook) has occurred (e.g., a windowing message has been generated), the hook triggers or executes any hook procedures associated therewith.

Optionally, in the method 800, each of the hook procedures triggered determines whether the virtual runtime engine is operating in "Surface Callback Mode" with respect to the relevant thread. The virtual runtime engine may determine the virtual runtime engine is operating in "Surface Callback Mode" with respect to the relevant thread(s) when an InSurfaceCallback flag stored in the Thread Local Storage is TRUE.

If the virtual runtime engine is operating in "Surface Callback Mode" with respect to the relevant thread(s), the windowing message detected in block 820 is passed on to the default message handler. Thus, the windowing message may be processed by the virtual runtime engine and displayed by the virtual operating system 120.

If the virtual runtime engine is not operating in "Surface Callback Mode" with respect to the relevant thread(s), optionally, before sending the windowing message to the Surface 322 in block 826, the virtual runtime engine may determine whether the windowing message is one in which the Surface is interested by searching the list.

If the windowing message is on the list, the virtual runtime engine sets the InSurfaceCallback flag to TRUE and sends a notification to the Surface 322 about the windowing message. The message is sent using a communication object configured to effect communication between the Surface 322 and virtual runtime engine. Then, in block 830 the Surface 322 waits for a response from the Surface 322.

When the Surface 322 receives the notification, it performs the method 600 described above. The method 600 analyzes the UI configuration file 169 to identify any Listeners for the windowing message and perform any actions associated therewith for which any associated conditions are satisfied.

The virtual runtime engine executing the virtual application 110 and the Surface 322 are separate applications both executing within a host operating system (e.g., the operating system 35A or 35B). While running the Listeners and performing their associated actions, the Surface 322 may generate or trigger one or more new windowing messages. When this occurs, the Surface 322 may need to call an operating system API function. However, instead of calling an API function of the windowing system of the host operating system, an API function call may be made to the virtual operating system 120. Thus, such messages may be sent to the target application (e.g., the virtual application 110) executing inside the virtual operating system 120.

In other words, the Surface 322 does not call the required API function directly. Instead, the Surface 322 calls an API function in an IWindowsAPI interface implementation. IWindowsAPI is an interface that contains some shadow methods of the original Windows API functions which the Surface uses within the ProxyWindow. When the Surface 322 needs to call a Windows API function in the ProxyWindow class, instead of calling that method directly, the ProxyWindow object uses the IWindowsApi instance to call the required method. When a method is called in the IWindowsApi interface implementation, a response object is created that identifies the API method to be called and its parameters values. Then, the data of this response object is serialized and transferred to the virtual runtime engine (e.g., via a named-pipe connection).

Because the Surface 322 and the virtual runtime engine are different applications (e.g., different Microsoft Windows applications), it may be beneficial to use a synchronized named-pipe connection to communicate between the two applications. However, those of ordinary skill in the art appreciate that other communication methods may be used.

When virtual runtime engine receives the serialized response message, the virtual runtime engine de-serializes the response message. The _OnSetParent function in the pseudo code above provides an example of a deserialization process.

Then, the virtual runtime engine calls the API function (within the virtual operating system 120) identified in the response message with the information included in the response. Alternatively, the virtual runtime engine could send the message to the Surface 322 to be processed.

This serialized response message has a message type value that indicates the type of the response message. By way of non-limiting examples, the response message type may include the values listed in Table J below.

As mentioned above, in addition to a type value, the serialized response message also includes the values of any arguments or parameters required to call the appropriate windowing API function.

Then, in blocks 830-840, the virtual runtime engine waits for additional response messages from the Surface 322 until the virtual runtime engine receives a response message of the type "eNoMoreResponses." When the virtual runtime engine receives response message of the type "eNoMoreResponses," the virtual runtime engine exits Surface Callback Mode in block 844.

The following pseudo code provides a non-limiting example of a method that may be used by the Surface to prepare the serialized message.

```
function Handle WriteSetParentMessage (PipeConnection connection,
        IntPtr hWndChild, IntPtr hWndParent)
{
    using (BinaryWriter writer = new BinaryWriter (new MemoryStream
        (connection.Buffer) , Encoding.Unicode))
    {
        writer.Write ((int)eSetParent) ;
        writer.Write (hWndChild.ToInt32 ( )) ;
        writer.Write (hWndParent.ToInt32 ( )) ;
        connection.BufferSize = (int)writer.BaseStream.Position;
    }
    connection.WriteMessageSync( ) ;
    // Puts into connection buffer which _extract reads from below
    connection.ReadMessageSync ( ) ;
    // Extract response
    return new IntPtr (_ExtractResponse (connection)) ;
}
```

The SurfaceSession class receives the windowing messages from the application's virtual environment and calls the appropriate Listeners for the windowing message. In particular embodiments, the virtual runtime engine may redirect all windowing messages to the Surface 322. However, as discussed above, in alternate implementations, the virtual runtime engine may send only messages included on list to the Surface 322.

| Message Type Value | Description |
| --- | --- |
| eNoMoreResponses | Indicates there are no more response messages. When virtual runtime engine sees this message, it finishes the send message notification to the Surface block and exits from the SurfaceCallback mode. |
| eSetWindowText | Indicates the Surface wants to call SetWindowText API function. |
| eSetWindowPos | Indicates the Surface wants to call SetWindowPos API function. |
| eEnableWindow | Indicates the Surface wants to call EnableWindow API function. |
| eSetWindowRgn | Indicates the Surface wants to call SetWindowRgn API function. |
| eShowWindow | Indicates the Surface wants to call ShowWindow API function. |
| eSetParent | Indicates the Surface wants to call SetParent API function. |
| ePostMessage | Indicates the Surface wants to call PostMessage API function. |
| eSendMessage | Indicates the Surface wants to call SendMessage API function. |
| eSendMessageWithTimeout | Indicates the Surface wants to call SendMessageWithTimeout API function. |
| eMoveWindow | Indicates the Surface wants to call MoveWindow API function. |
| eSetForegroundWindow | Indicates the Surface wants to call SetForegroundWindow API function. |
| eSetWindowLong | Indicates the Surface wants to call SetWindowLong API function. |
| ePrintWindow | Indicates the Surface wants to call PrintWindow API function. |
| eInvalidateRect | Indicates the Surface wants to call InvalidateRect API function. |
| eUpdateWindow | Indicates the Surface wants to call UpdateWindow API function. |
| eBringWindowToTop | Indicates the Surface wants to call BringWindowToTop API function. |
| eSwitchToThisWindow | Indicates the Surface wants to call SwitchToThisWindow API function. |

```
// This function is called by the XVM to notify the Surface that a
// new window message is received to the target application
function Handle IntPtr ProcessSurfaceMessage(IWindowsApis
apiProxy, Handle hWnd, int msg, Handle wParam, Handle lParam)
{
    // create the ProxyWindow instance, which indicates
    // the owner window of this message
    ProxyWindow window = ProxyWindow.FromHandle (hWnd) ;
    // Set the api proxy
    window.ApiProxy = apiProxy;
    // create the message information
    HOOK_MSG hmsg = new HOOK_MSG ( ) ;
    hmsg.msg = msg;
    hmsg.wParam = wParam;
    hmsg.lParam = lParam;
    // create Surface ListenerContext which contains
    // the required data
    ListenerContext context = _Surface.CreateContext (hmsg,
        ListenerType.SurfaceWindowMessage, Convert.ToInt32
        (hmsg.msg)) ;
    // Add required data to the Context
    context.SetData(apiProxy) ;
    context.SetData(window) ;
    context.SetData(hmsg) ;
    // Run listeners
    Surface.RunListener(Context) ;
}
```

At this point, the APIProxy of the ProxyWindow is assigned to the APIProxy member of the ProcessSurfaceMessage. This APIProxy is the IWindowsApi interface implementation responsible for sending the called function information to the virtual runtime engine as the serialized response message. When the virtual runtime engine receives the response message, the virtual runtime engine calls the API function identified. Therefore, the function calls performed by the Surface are executed in the thread of the virtual application 110.

The following pseudo code provides a non-limiting example of a function named "RunListener" that may be used by the Surface 322 to implement a Listener.

```
function void RunListener(ListenerContext context)
{
    // Run all listeners in the current configuration file
    Configuration.RunListener(context) ;
}
function void SurfaceConfiguration::RunListener(ListenerContext
context)
{
    // add this config to the top of the execution stack
    context.Stack.Begin(this) ;
    // Run all listeners in this configuration while the context is
Alive
    for (int i = 0; i < Listeners.Count && context.IsAlive; i++) {
        Listeners[i].Run(context) ;
    }
    // Run inherited configuration's Listeners
    for (int i = 0; i < Inherits.Count; i++) {
        Inherits[i].Configuration.RunListener(context) ;
    }
    // Remove this config from the Top of the execution stack
    context.Stack.Finish( ) ;
}
// This function is runs the Listener according to the context
function void Listener::Run(ListenerContext context)
{
    // If Listener is disabled do not run
    if (!_Enabled)
        return;
    // If Data is not valid then do not run
    if (!_FilterData(context))
        return;
    // If there is condition and it is not validate then do not run
    if (Condition != null && !Condition.Validate(context))
        return;
    // If there is an action, apply it
    if (Action != null)
        Action.Apply(context) ;
}
```

A ListenerContext object may be validated by a method of a Condition object. For example, the Condition objects may include a method named "Validate" that receives a ListenerContext object as an argument. The "Validate" function determines whether the ListenerContext object is valid. Different types of Condition objects may have different "Validate" functions. The following pseudo code provides a non-limiting example of a "Validate" function that may be used by a Condition object of type "BooleanCondition."

```
function bool BooleanCondition::Validate(ListenerContext context)
{
    bool left = (bool) Left.GetValue(context) ;
    bool right = (bool) Right.GetValue(context) ;
    switch (Operator)
    {
        case ComparisionOperator.Equal:
            return left == right;
        case ComparisionOperator.NotEqual:
            return left != right;
    }
}
```

In the above pseudo code, the left and right Boolean variable values are assigned the Left and Right values of a DataObject. Left and Right of the BooleanCondition are derived from DataBase class and are Data Objects. All data objects have a GetValue method to get the stored data and SetValue to store the data.

As mentioned above, Data type object of different types may have different working procedures. The following pseudo code provides non-limiting examples of GetValue and SetValue methods that may be included in Data type objects of type "DataVariable."

```
// Function which Gets the value of a Variable with in the given
Listener Context
function object DataVariable::GetValue(ListenerContext context)
{
    // Resolve the variable
    _EnsureVariable(context) ;
    // Gets the variable's current value
    if(_Variable != null)
        return _Variable.Value;
    throw new UnknownVariableException(Name) ;
}
// Finds the variable and put its reference
function void _EnsureVariable(ListenerContext context)
{
    // if we already resolve it, then ignore call
    if (_IsAlreadyResolved(context))
        return;
    // Split the parts of the name
    string[ ] parts = Name.Split('.') ;
    // From the current configuration objects begin to ResolveLink
to find the variables real configuration file
    SurfaceConfiguration config = context.Stack.Current;
    config = configuration.ResolveLink(parts, 0, parts.Length – 1) ;
    if (config == null)
        throw new UnknownConfigInheritance( ) ;
```

```
// put the configuration and variable for its resuability
_Configuration = config;
_Variable = config.Variables[parts[parts.Length − 1]] ;
}
// Sets the value of a variable
function void SetValue(ListenerContext context, object value)
{
   _EnsureVariable(context) ;
   if (_Variable != null)
   {
      Variable.Value = value;
   }else
   {
      _Variable = new Variable(Name) ;
      _Variable.Value = value;
      _Configuration.Variables.Add(_Variable) ;
   }
}
```

Condition objects and Action objects of different types may also have different working methods. Further, each UI configuration file may include a unique configuration for Condition objects and/or Action objects. For example, the following pseudo code provides non-limiting examples of a "DoOperation" method of an Action object having the type "BreakAction."

```
// Operation method for the Break operation
function bool BreakAction::DoOperation(ListenerContext context)
{
   // force that all remaining listeners won't work
   context.IsAlive = false;
   return true;
}
```

For example, the following pseudo code provides non-limiting examples of a "DoOperation" method of an Action object having the type "Assignment."

```
// Operation method for the Assignment action
function bool Assignment::DoOperation(ListenerContext context)
{
   // get the Right data object value
   object value = Right.GetValue(context) ;
   // assign that value to the Left data object
   Left.SetValue(context, value) ;
}
```

Computing Device

Figure 8:
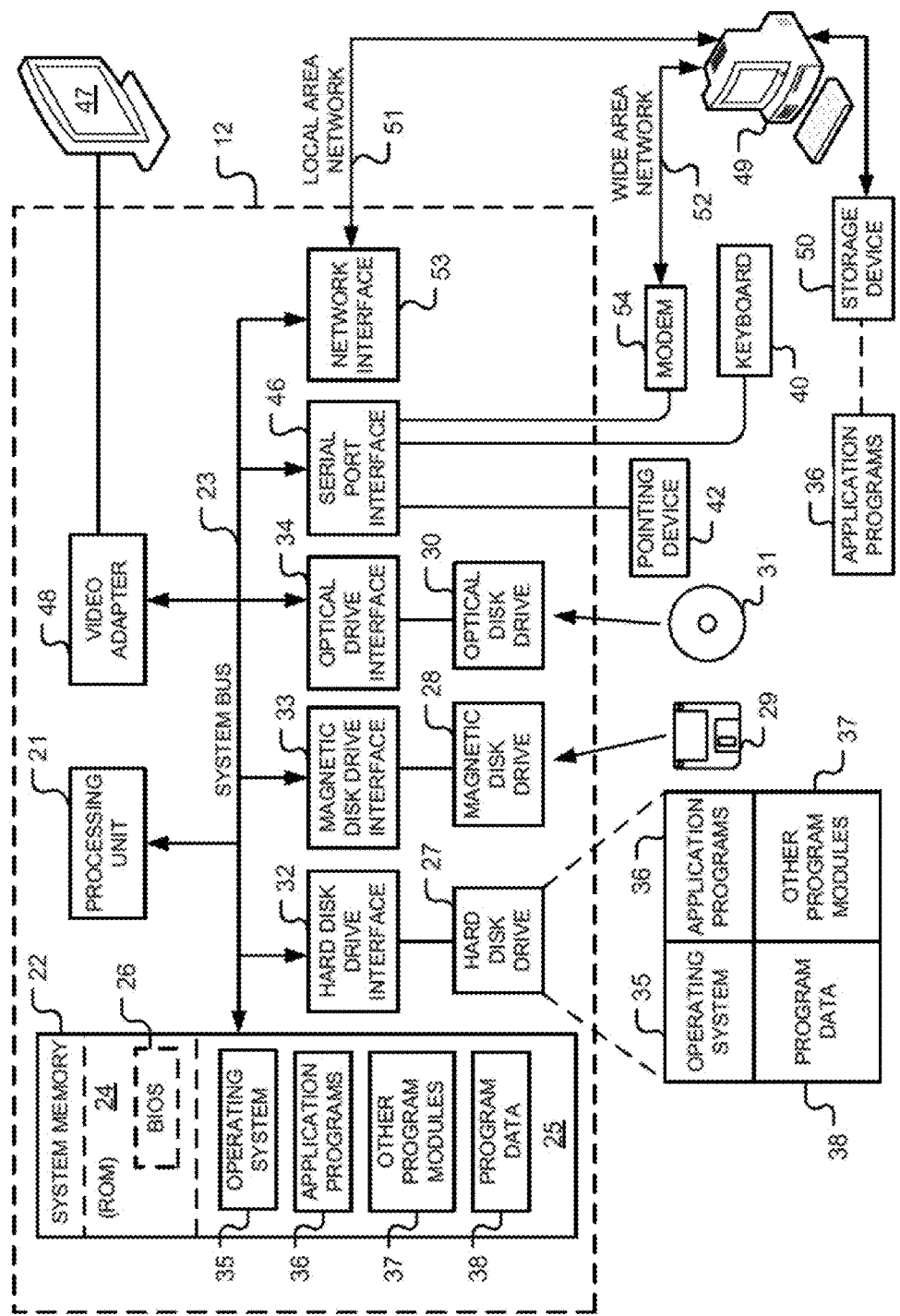
FIG. 8 is a diagram of a hardware environment and an operating environment in which the computing devices of the system of FIG. 1 may be implemented.

FIG. 8 is a diagram of hardware and an operating environment in conjunction with which implementations of the client computing device 9 (including the Client Application 132, the Sandbox Manager 134, the virtual machine executable files 137, the transferred virtualized application file 140, and the UI configuration file 169), the server computing device 7 (including the virtualized application file 140, the UI configuration file 169, the web server components 142, and the authoring tool 170), and the network 10 may be practiced. The description of FIG. 8 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that implementations may be practiced with other computer system configurations, including hand-held devices, multi-processor systems, microprocessor-based or programmable consumer electronics, network PCs, minicomputers, mainframe computers, and the like. Implementations may also be practiced in distributed computing environments where tasks are performed by remote processing devices that are linked through a communications network. In a distributed computing environment, program modules may be located in both local and remote memory storage devices.

The exemplary hardware and operating environment of FIG. 8 includes a general-purpose computing device in the form of a computing device 12. Each of the client computing device 9 and the server computing device 7 may be implemented in accordance with the computing device 12. By way of non-limiting example, the Client Application 132, the Sandbox Manager 134, the virtual machine executable files 137, the transferred virtualized application file 140, and the UI configuration file 169 may be implemented on a first computing device like the computing device 12. The web server components 142, and the authoring tool 170 may be implemented on a second computing device like the computing device 12 configured to store the virtualized application file 140 (and the UI configuration file 169) and generate a web page displaying a link (e.g., a hyperlink) to the virtualized application file 140, a link to the UI configuration file 169, and providing a reference to the plug-in 136.

The computing device 12 includes the system memory 22. Each of the system memory 22A (see FIG. 2) and the system memory 22B (see FIG. 2) may be constructed in accordance with the system memory 22.

The computing device 12 also includes a processing unit 21, and a system bus 23 that operatively couples various system components, including the system memory 22, to the processing unit 21. There may be only one or there may be more than one processing unit 21, such that the processor of computing device 12 comprises a single central-processing unit (CPU), or a plurality of processing units, commonly referred to as a parallel processing environment. The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computing device 12. It should be appreciated by those skilled in the art that any type of computer-readable media which can store data that is accessible by a computer, such as magnetic cassettes, flash memory cards, USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, USB drives, and the like) accessible by the processing unit 21 may be considered components of the system memory 22.

A number of program modules may be stored on the hard disk drive 27, magnetic disk 29, optical disk 31, ROM 24, or RAM 25, including an operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 8 include a local-area network (LAN) 51 and a wide-area network (WAN) 52. Such networking environments are commonplace in offices, enterprise-wide computer networks, intranets and the Internet. The network 10 may include any of the aforementioned networking environments.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

Returning to FIG. 2, the operating system 35A, the Client Application 132, the Sandbox Manager 134, the virtual machine executable files 137, the transferred virtualized application file 140, and the UI configuration file 169 may be stored as computer executable components on the system memory 22A. Each of the operating system 35A, the Client Application 132, the Sandbox Manager 134, the virtual machine executable files 137, the transferred virtualized application file 140, and the UI configuration file 169 may be implemented using software components that are executable by the processing unit 21 and when executed perform the functions described above.

Returning to FIG. 3, the virtualized application file 140, the UI configuration file 169, the web server components 142, and the authoring tool 170 may be stored as computer executable components on the system memory 22B. Each of the virtualized application file 140, the UI configuration file 169, the web server components 142, and the authoring tool 170 may be implemented using software components that are executable by the processing unit 21 and when executed perform the functions described above.

The memory 22A may store computer executable instructions that when executed by one or more processors cause the one or more processors to perform all or portions of the methods described above. Further, such instructions may be stored on one or more non-transitory computer-readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A computer executable method for use with a virtual application configured to generate a first user interface and a second application displaying a second user interface, the second user interface being different from the first user interface, the method comprising:
   executing, by a user interface manager executing in a host operating system, the virtual application inside a virtual runtime environment that encapsulates the virtual application from the host operating system;
   receiving, at the user interface manager, a user interface message generated by the virtual application, the user interface message comprising instructions configured to modify the first user interface generated by the virtual runtime engine;
   generating, at the user interface manager, at least one user interface command for the second user interface, the at least one user interface command being generated based on the user interface message; and
   sending, by the user interface manager, the at least one user interface command to the second application, the at least one user interface command being configured to cause the second application to modify the second user interface.

2. The method of claim 1, further comprising:
   downloading the virtual application from a server over the Internet.

3. The method of claim 1, further comprising:
   performing an initialization process;
   if execution of the virtual application is not initiated in a shell, initiating execution of the virtual application in a suspended state thereby suspending execution of the virtual application; and
   ending the suspension of the execution of the virtual application after the initialization process has completed.

4. The method of claim 1, further comprising after receiving the user interface message:
   identifying one or more of a plurality of listeners configured to generate a user interface command for the user interface message, each of the plurality of listeners comprising at least one condition and at least one action; and
   for each listener identified, determining whether the at least one condition is satisfied, and if the at least one condition is satisfied, performing the at least one action of the listener, the at least one action generating one or more user interface commands.

5. The method of claim 4, further comprising:
   loading at least one configuration file comprising configuration information for the plurality of listeners; and
   configuring the plurality of listeners based on the configuration information.

6. The method of claim 1 wherein the virtual runtime environment is implemented by a virtual runtime engine,
   the virtual runtime engine captured the user interface message and sent the user interface message to the user interface manager, and
   the capturing of the user interface message prevents the virtual application from modifying the first user interface.

7. The method of claim 1, further comprising:
   receiving a handle to the second user interface; and
   using the handle to send the at least one user interface command to the second application.

8. The method of claim 1, wherein the virtual runtime environment is implemented by a virtual runtime engine, and the method further comprises:
   generating at least one message identifying a call to an application programming interface function of the virtual runtime environment; and
   sending the at least one message to the virtual runtime engine, the virtual runtime engine being configured to call to the application programming interface function of the virtual runtime environment.

9. A computer executable method for use with a virtual application and a web browser, the web browser displaying a web page comprising a control configured to display content, the method comprising:
   executing, by a user interface manager executing in a host operating system, the virtual application within a virtual runtime environment implemented by a virtual runtime engine, the virtual application being encapsulated from the host operating system by the virtual runtime environment, the virtual application being configured to call windowing functions operable to display or modify at least one window of a first user interface generated by the virtual runtime engine, the virtual runtime engine being configured to capture calls to the windowing functions and generate user interface messages based on the captured calls, the capturing of the calls preventing the display or modification of the at least one window;
   receiving, at the user interface manager, at least one of the user interface messages generated by the virtual runtime engine, the received at least one user interface message comprising instructions to display or modify the at least one window;
   generating, at the user interface manager, at least one user interface command for the control displayed by the web page, the at least one user interface command being generated based on the instructions to display or modify the at least one window; and
   sending, by the user interface manager, the at least one user interface command to the control, the at least one user interface command being configured to cause the control to display or modify the content displayed by the control.

10. A computer executable method comprising:
executing an application inside a runtime environment provided at least in part by a runtime engine, the runtime engine executing in a host operating system, the application being encapsulated from the host operating system by the runtime environment, the application being configured to instruct the runtime environment to generate a first user interface when executing;
capturing, by the runtime engine, user interface messages generated by the executing application, the user interface messages including instructions to the runtime environment to modify the first user interface;
sending, by the runtime engine, at least a portion of the captured user interface messages to an external process configured to generate a second user interface different from the first user interface, both the external process and the second user interface executing outside the portion of the runtime environment provided by the runtime engine;
receiving, by the runtime engine, one or more application programming messages from the external process in response to having sent the portion of the captured user interface messages to the external process; and
calling, by the runtime engine, one or more application programming interfaces inside the runtime environment associated with a first portion of the one or more application programming messages.

11. The method of claim 10, wherein the one or more application programming messages are received over a named-pipe connection between the runtime engine and the external process.

12. The method of claim 10, wherein the external process is a user interface manager of a virtual process manager configured to download the application from a server over the Internet and initiate execution of the application.

13. The method of claim 12, wherein the virtual process manager is configured to render the second user interface in a control displayed by a webpage displayed by a web browser.

14. The method of claim 13, wherein the control comprises contents of one or more windows.

15. The method of claim 10, wherein the first portion of the one or more application programming messages comprises fewer than all of the one or more application programming messages, and the method further comprises:
sending at least one user interface message to the external process for each application programming message not in the first portion of the one or more application programming messages.

16. The method of claim 10, further comprising:
comparing the captured user interface messages to a list of user interface messages, the portion of the captured user interface messages sent to the external process comprising ones of the captured user interface messages on the list of user interface messages to send to the external process.

17. The method of claim 10, wherein the application comprises one or more threads, and the method further comprises:
setting up a hook procedure for each of the one or more threads, each hook procedure being executable by a hook configured to monitor the thread for user interface messages, the hook triggering the execution of the hook procedure whenever the hook detects a user interface message, when executed, the hook procedure providing an indication that a user interface message has been generated.

18. A computer executable method comprising:
executing an application inside a runtime environment generated at least in part by a runtime engine, the runtime engine executing in a host operating system, the application being encapsulated from the host operating system by the runtime environment, the application calling user interface functions that cause the runtime engine to generate a first user interface, the runtime engine capturing the calls to the user interface functions, generating messages comprising information associated with the captured calls, and forwarding the messages to a user interface manager, the user interface manager being a separate application from the runtime engine;
receiving, at the user interface manager, the messages comprising the information associated with the captured calls, the user interface manager translating the information associated with the captured calls into instructions for a control displayed by a web browser, and sending the instructions to the control; and
receiving, at the control, the instructions sent by the user interface manager, the control displaying a second user interface for the application based on the instructions.

19. The method of claim 18, further comprising:
at the user interface manager, generating a call to an application programming interface, generating an application programming message comprising information associated with the call to the application programming interface, and sending the application programming message to the runtime engine; and
at the runtime engine, receiving the application programming message, and calling the application programming interface associated with the information in the application programming message.

20. The method of claim 18, further comprising:
downloading the application from a server over the Internet.

* * * * *